US011719549B2

United States Patent
Ohmura et al.

(10) Patent No.: US 11,719,549 B2
(45) Date of Patent: Aug. 8, 2023

(54) VEHICLE CONTROL APPARATUS

(71) Applicant: Mazda Motor Corporation, Hiroshima (JP)

(72) Inventors: Hiroshi Ohmura, Aki-gun (JP); Takashi Goto, Aki-gun (JP); Yasuhiro Kawahara, Aki-gun (JP); Ryusuke Nomiyama, Aki-gun (JP); Akihiro Motodani, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 170 days.

(21) Appl. No.: 17/205,004

(22) Filed: Mar. 18, 2021

(65) Prior Publication Data

US 2021/0325197 A1  Oct. 21, 2021

(30) Foreign Application Priority Data

Apr. 17, 2020 (JP) ................................. 2020-074224

(51) Int. Cl.
| | |
|---|---|
| *G01C 21/34* | (2006.01) |
| *B60W 30/09* | (2012.01) |
| *B60W 30/095* | (2012.01) |
| *B60W 50/00* | (2006.01) |

(52) U.S. Cl.
CPC ......... *G01C 21/3484* (2013.01); *B60W 30/09* (2013.01); *B60W 30/0956* (2013.01); *B60W 50/0097* (2013.01); *B60W 2520/105* (2013.01); *B60W 2520/14* (2013.01);
(Continued)

(58) Field of Classification Search
CPC .............. G01C 21/3484; B60W 30/09; B60W 30/0956; B60W 50/0097; B60W 2554/80; B60W 2520/105; B60W 2520/14; B60W 2520/18; B60W 2540/18
See application file for complete search history.

(56) References Cited

U.S. PATENT DOCUMENTS

2020/0369284 A1\*  11/2020  Chen ................. B60W 50/0097
2021/0188356 A1\*  6/2021  Goto ....................... B62D 6/00

FOREIGN PATENT DOCUMENTS

| | | |
|---|---|---|
| JP | 2013-137628 A | 7/2013 |
| JP | 2019-43190 A | 3/2019 |

OTHER PUBLICATIONS

Machine translation of JP5765222 (Year: 2015).*

\* cited by examiner

*Primary Examiner* — Jeff A Burke
*Assistant Examiner* — Mohamad O El Sayah
(74) *Attorney, Agent, or Firm* — Xsensus LLP

(57) ABSTRACT

A vehicle control apparatus is configured to execute processing to calculate a correction travel route and a control target value on the basis of a target travel route under a specified constraint condition. The vehicle control apparatus calculates the correction travel route by using an evaluation function in a manner to minimize a difference of the correction travel route from the target travel route. The evaluation function is a sum that is acquired by weighting the evaluation value at each prediction point by weight coefficients. A time interval between each adjacent pair of the prediction points is set to be increased from a near side toward a far side from the vehicle. The weight coefficients are set such that weight at the prediction point on the far side from the vehicle is less than the weight at the prediction point on the near side of the vehicle.

17 Claims, 9 Drawing Sheets

(52) U.S. Cl.
CPC ..... *B60W 2520/18* (2013.01); *B60W 2540/18* (2013.01); *B60W 2554/80* (2020.02)

VEHICLE CONTROL APPARATUS

CROSS-REFERENCE TO RELATED APPLICATION

The present application claims priority to Japanese App. No. 2020-074224 filed Apr. 17, 2020, the entire content and disclosure of which is incorporated by reference herein in its entirety.

TECHNICAL FIELD

Embodiments of the present disclosure relate to a vehicle control apparatus and, in particular, to a vehicle control apparatus that assists a driver with driving of a vehicle.

BACKGROUND ART

A technique of calculating a predictive travel route in the future by executing model prediction control using a vehicle model that specifies physical motion of a vehicle is proposed (for example, see Patent document 1). In the technique described in Patent document 1, the predictive travel route until a lapse of a specified prediction period (for example, three seconds) is calculated, and control targets (a target steering angle and target acceleration) are calculated to make the vehicle travel on this predictive travel route. In this case, in order to calculate the further precise control targets in the future, it is desired to calculate the predictive travel route for the longer prediction period. However, there can be a problem of an increased calculation load when the predictive travel route is calculated for the longer prediction period.

Meanwhile, in the field of robot control, a technique of changing an interval between plural prediction points in the prediction period when model prediction control is used is proposed (for example, see Patent document 2). In Patent document 2, a time interval between the prediction points is increased with time, and weight of an evaluation function is increased linearly according to a length of the time interval. That is, the time interval between the prediction points is set to be gradually increased with time, and the weight of the evaluation function at the prediction point on a far side is set to be greater than that at the prediction point on a near side. In this way, a degree of influence at each of the prediction points can be equalized.

Accordingly, with reference to Patent documents 1, 2, it is considered that, when the interval between the prediction points is increased with time to calculate the predictive travel route of the vehicle, the predictive travel route for the longer prediction period can be calculated while the increase in the calculation load is suppressed.

PRIOR ART DOCUMENTS

Patent Documents

[Patent document 1] JP-A-2019-43190
[Patent document 2] JP-A-2013-137628

SUMMARY

A vehicle control apparatus for assisting with driving of a vehicle, wherein the vehicle control apparatus is configured to repeatedly execute, in specified control cycles: processing to calculate a target travel route of the vehicle; and processing to calculate a correction travel route based on the target travel route under a specified constraint condition using a vehicle model for estimation of behavior of the vehicle and to calculate a control target value of the vehicle so as to make the vehicle travel on the correction travel route. When calculating the correction travel route, the vehicle control apparatus can calculate the correction travel route using an evaluation function for evaluation of the correction travel route under the constraint condition to minimize a difference in the correction travel route from the target travel route. The correction travel route can include plural prediction points that the vehicle passes before lapse of a specified prediction period, and the evaluation function is a sum that is acquired by weighting an evaluation value at each of the prediction points by a weight coefficient that is set for each of the prediction points. A time interval between each adjacent pair of the prediction points of the plural prediction points can be set to be increased from a near side toward a far side from the vehicle, and the weight coefficient, which is set for each of the prediction points, can be set such that weight at the prediction point on the far side from the vehicle is less than weight at the prediction point on the near side of the vehicle.

DETAILED DESCRIPTION

Figure 12A:
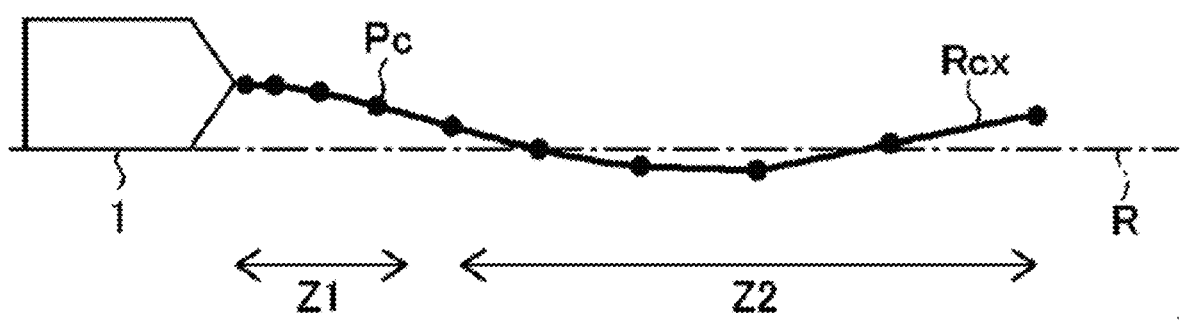
FIG. 12A illustrates a candidate travel route in a calculation process according to a conventional example.
Figure 12B:
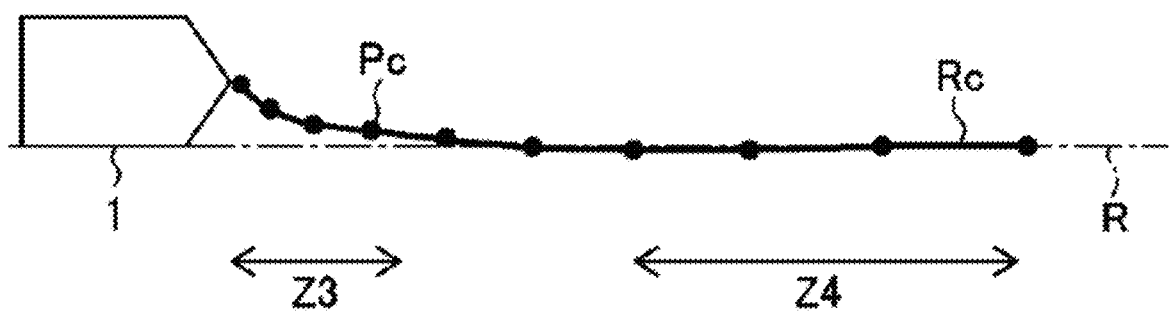
FIG. 12B illustrates an optimum candidate travel route according to the conventional example.

The present inventors found that, in the case where the interval between the prediction points was simply increased with time at the time of calculating the predictive travel route of the vehicle by using the model prediction control, the predictive travel route, in which such vehicle behavior that gave a driver a sense of discomfort occurred, was possibly calculated. FIG. 12A and FIG. 12B each illustrate an example in which the interval between the prediction points is gradually increased by combining Patent documents 1, 2 when the predictive travel route is calculated by using the model prediction control.

FIG. 12A illustrates a candidate travel route Rcx that is calculated in a calculation process of a correction travel route Rc as the predictive travel route, and FIG. 12B illustrates the correction travel route Rc (the predictive travel route) that is an optimum candidate travel route selected from the plural candidate travel routes Rcx. An example illustrated in each of FIG. 12A and FIG. 12B is a situation where a vehicle 1, which travels at a position shifted to a side from a center of a lane, changes a course toward the center of the lane, for example. A target travel route R (a one-dot chain line) after the course change is illustrated in each of the drawings. Accordingly, the vehicle 1 can optimize the candidate travel route Rcx and calculates the correction travel route Rc so as to travel on this target travel route R in the end. Here, in regard to the evaluation function that is used for the calculation of the predictive travel route, weight at a prediction point Pc on a far side is set to be greater than weight at a prediction point Pc on a near side.

In each of FIG. 12A and FIG. 12B, the candidate travel route Rcx (and the correction travel route Rc) has the ten prediction points Pc, and a time interval between each two of these prediction points Pc is increased with time. The control targets (the target steering angle and the target acceleration) at each of prediction points Pc(k) are maintained until the next prediction point Pc(k+1). Thus, between the prediction points, the vehicle 1 travels in a state where the same target steering angle and the same target acceleration are maintained.

On the candidate travel route Rcx illustrated in FIG. 12A, in a section z1 near a current position of the vehicle 1, a steering angle is gradually increased with time so as to prevent an abrupt behavior change, and the vehicle 1 gradually approaches the target travel route R. However, since the interval between the prediction points Pc is long in a section z2 away from the current position of the vehicle 1, the vehicle 1 passes the target travel route R. Next, the control targets are set such that the vehicle 1 approaches the target travel route R again by a steering angle operation in a reverse direction. Such meandering or "deviation" is repeated for a long time in the section z2 where the weight of the evaluation function is set to be great. Thus, evaluation using the evaluation function of the candidate travel route Rcx, which is illustrated in FIG. 12A, is lowered.

On the contrary, on the correction travel route Rc illustrated in FIG. 12B, deviation from the target travel route R is small in a section z4 away from the current position of the vehicle 1. Thus, evaluation using the evaluation function is high. However, on the correction travel route Rc, rapid steering is requested in a section z3 on a near side in order to reduce the deviation in the section z4 on the far side and thus to converge the deviation to the target travel route R promptly. That is, even in the case where the evaluation using the evaluation function is lowered by the rapid steering in the section z3 on the near side of entire predictive sections of the correction travel route Rc, the evaluation thereof as the entire predictive sections becomes high.

In the case of the robot control, even when the rapid operation is performed as on the correction travel route Rc in FIG. 12B, inconvenience is less likely to occur. However, in a case of vehicle drive control, differing from the robot control, a sensation (comfort or the like) that the vehicle behavior gives the driver has to be considered. That is, on the correction travel route Rc, a significant change in the vehicle behavior, which is caused by the rapid steering in the section z3 on the near side, possibly gives the driver the sense of discomfort. In general, even when correction of the travel position or the like is predicted far away, the driver performs a driving operation while placing emphasis on stabilization of the current vehicle behavior. Thus, there is a high possibility that the correction travel route Rc illustrated in FIG. 12B possibly gives the driver the sense of discomfort.

Embodiments of the present disclosure have been made to solve such a problem (and optionally other problems) and therefore can have a purpose, of one or more purposes, of providing a vehicle control apparatus capable of calculating a predictive travel route on which an interval between prediction points can be set to be longer on a far side from a vehicle than on a near side, and which may not give or may mitigate giving a driver a sense of discomfort.

In order to solve the above-described problem and optionally other problems, embodiments of the present disclosure can provide a vehicle control apparatus for assisting with driving of a vehicle. The vehicle control apparatus can be configured to repeatedly execute, in specified control cycles: processing to calculate a target travel route of the vehicle; and processing to calculate a correction travel route on the basis of the target travel route under a specified constraint condition by using a vehicle model for estimation of behavior of the vehicle and to calculate a control target value of the vehicle so as to make the vehicle travel on the correction travel route. When calculating the correction travel route, the vehicle control apparatus can calculate the correction travel route by using an evaluation function for evaluation of the correction travel route under the constraint condition in a manner to minimize a difference in the correction travel route from the target travel route. The correction travel route can include plural prediction points that the vehicle passes before lapse of a specified prediction period. The evaluation function can be a sum that is acquired by weighting an evaluation value at each of the prediction points by a weight coefficient that is set for each of the prediction points. A time interval between each adjacent pair of the prediction points of the plural prediction points can be set to be increased from a near side toward a far side from the vehicle. The weight coefficient, which can be set for each of the prediction points, can be set such that weight at the prediction point on the far side from the vehicle is less than the weight at the prediction point on the near side of the vehicle.

Thus, according to one or more embodiments of the present disclosure, the weight at the prediction point on the far side from the vehicle can be set to be less than the weight at the prediction point on the near side of the vehicle, and thus the evaluation value at the prediction point on the far side can be estimated to be low. Accordingly, in one or more embodiments of the present disclosure, the time interval between each adjacent pair of the prediction points can be set to be increased from the near side toward the far side from the vehicle. However, deviation at the prediction point on the far side, the interval of which can be set to be long, can have a small influence on the prediction point on the near side. Thus, in one or more embodiments of the present disclosure, it can be possible to calculate the control target that conforms to a driving characteristic of the driver that places emphasis on travel safety and travel comfort on the near side of the vehicle and that may not give or may mitigated giving the driver a sense of discomfort.

In one or more embodiments of the present disclosure, the weight at each of the prediction points can be set to be inversely proportional to a square of a time that is required for the vehicle to arrive at each of the prediction points by using the weight coefficient that is set for each of the prediction points. In the case where a distance between the driver and the target is increased by n times, a moving speed of the target can become $1/n$ when seen from the driver. Thus, kinetic energy of the target felt by the driver (that is, an amount of a stimulus that the driver receives from the target) can become $1/n^2$. In one or more embodiments of the present disclosure, the weight coefficient of the evaluation function can be set on the basis of this characteristic. Thus, it can be possible to calculate the control target that conforms to the amount of the stimulus that the driver receives from the surrounding environment.

In one or more embodiments of the present disclosure, the weight at each of the prediction points can be set to be proportional to a common logarithm of a value that is inversely proportional to a square of a time required for the vehicle to arrive at each of the prediction points by using the weight coefficient that is set for each of the prediction points. In the case where the distance between the driver and the target is increased by n times, the moving speed of the target can become $1/n$ when seen from the driver. Thus, the amount of the stimulus that the driver receives from the target can become $1/n^2$. Furthermore, according to the Fechner's law, an amount of psychological sensation given to a person can be proportional to the common logarithm of an amount of the stimulus. Accordingly, in one or more embodiments of the present disclosure, the weight coefficient of the evaluation function can be set on the basis of this characteristic. Thus, it can be possible to calculate the control targets that conform to the sensation of the driver.

In one or more embodiments of the present disclosure, at each of the prediction points, the evaluation function can include: an evaluation term for evaluating the correction travel route; and a constraint term that lowers the evaluation value when the correction travel route does not satisfy the constraint condition. At each of the prediction points, weight of the weight coefficient of the constraint term can be set to be greater than weight of the weight coefficient of the evaluation term. The weight coefficient of the constraint term can be set such that the weight thereof at the prediction point on the far side from the vehicle is less than the weight thereof at the prediction point on the near side of the vehicle.

Thus, according to one or more embodiments of the present disclosure, the evaluation function can include the constraint term for calculating the evaluation value related to the constraint condition. In one or more embodiments of the present disclosure, the correction travel route can be derived by solving the unconstrained optimization problem. Thus, it can be possible to improve calculation convergence. In addition, in one or more embodiments of the present disclosure, the weight of the constraint term can be set to be greater on the near side than on the far side. Thus, it can be possible to prevent the calculation of such an answer that does not satisfy the constraint condition on the near side in order to avoid a violation of the constraint condition on the far side.

In one or more embodiments of the present disclosure, the vehicle control apparatus can detect an obstacle on the outside of the vehicle, and can set a speed distribution area, which can define distribution of an allowable upper limit value of a relative speed of the vehicle to the obstacle, between the obstacle and the vehicle, and the allowable upper limit value in this speed distribution area can be set to be increased as the distance from the obstacle is increased. The constraint condition can include that a relative speed of the vehicle to the obstacle does not exceed an allowable upper limit value in the speed distribution area. According to one or more embodiments of the present disclosure, the weight of the constraint term can be set to be greater on the near side than on the far side. Thus, it can be possible to calculate the control target in a manner to conform to the driving characteristic of the driver that prioritizes appropriateness of a positional relationship with the obstacle near the vehicle over a positional relationship with the obstacle far away from the vehicle.

According to the vehicle control apparatus according to embodiments of the present disclosure, it can be possible to calculate the predictive travel route in which the interval between the prediction points is set larger on the far side from the vehicle than on the near side and which may not give or may mitigated giving the driver the sense of discomfort.

A description will hereinafter be made on a vehicle control apparatus according to an embodiment of the present invention with reference to the accompanying drawings.

Figure 1A:
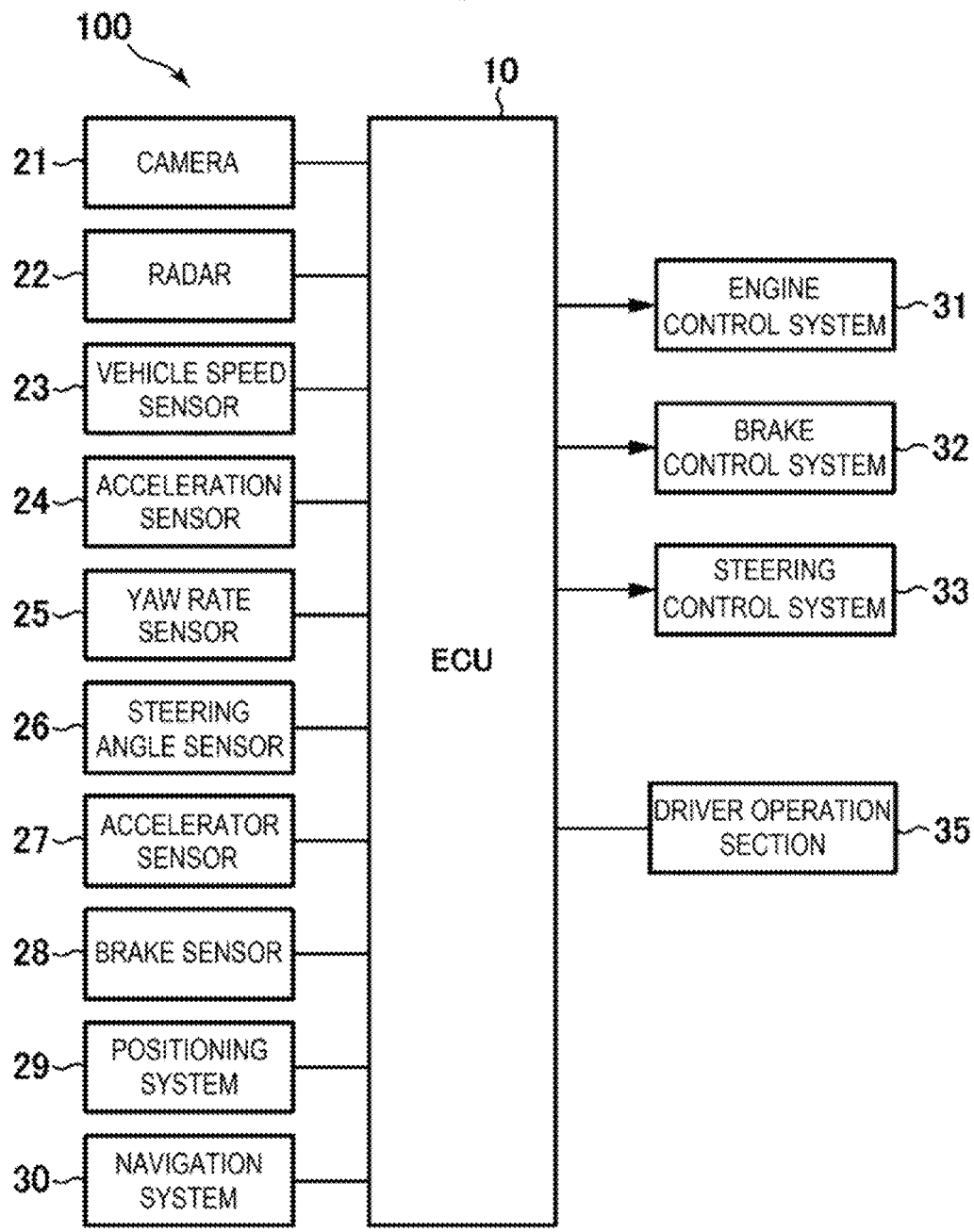
FIG. 1A is a configuration diagram of a vehicle control apparatus according to one or more embodiments of the present disclosure.

First, a description will be made on a configuration of the vehicle control apparatus with reference to FIG. 1A, FIG. 1B, and FIG. 2. FIG. 1A is a configuration diagram of the vehicle control apparatus, FIG. 1B is a view illustrating details of a driver operation section, and FIG. 2 is a control block diagram of the vehicle control apparatus.

A vehicle control apparatus 100 in one or more embodiments can be configured to provide a vehicle 1 (see FIG. 4 and the like), on which this vehicle control apparatus 100 can be mounted, with different driving assistance controls in plural driving assistance modes. The driving assistance control can differ by driving assistance mode. A driver can select a desired driving assistance mode from the plural driving assistance modes.

As illustrated in FIG. 1A, the vehicle control apparatus 100 is mounted on the vehicle 1, and includes a vehicle control arithmetic section (ECU) 10, plural sensors and switches, plural control systems, and a driver operation section 35 used for user input in relation to the driving assistance mode. The plural sensors and switches can include an in-vehicle camera 21, a millimeter-wave radar 22, plural behavior sensors that detect behavior of the vehicle (a vehicle speed sensor 23, an acceleration sensor 24, a yaw rate sensor 25, a steering angle sensor 26, an accelerator sensor 27, and a brake sensor 28), a positioning system 29, and a navigation system 30. The plural control systems can include an engine control system 31, a brake control system 32, and a steering control system 33.

Figure 1B:
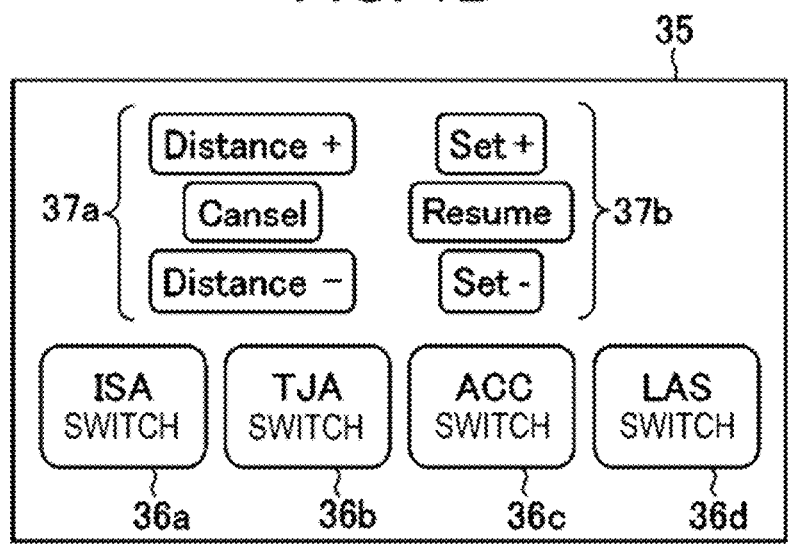
FIG. 1B is a diagram illustrating details of a driver operation section in the vehicle control apparatus according to one or more embodiments of the present disclosure.
Figure 2:
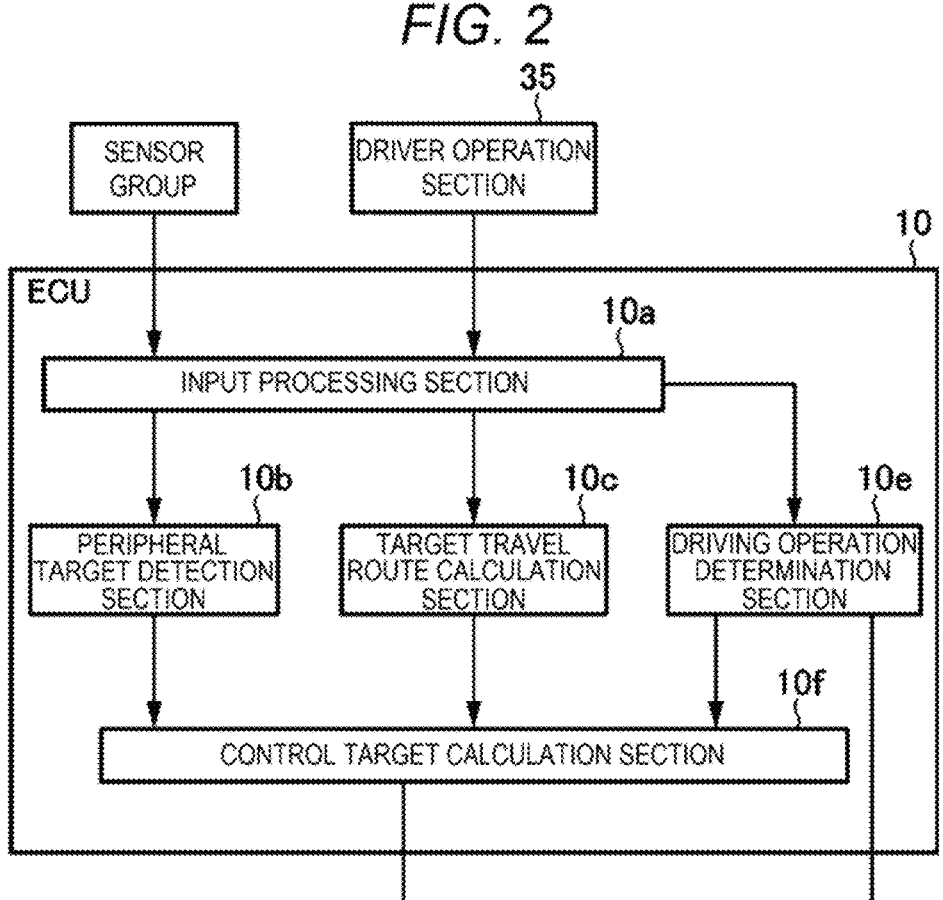
FIG. 2 is a control block diagram of the vehicle control apparatus according to one or more embodiments of the present disclosure.

As illustrated in FIG. 1B, the driver operation section 35 is provided in a cabin of the vehicle 1 so that the driver can operate the driver operation section 35, and can function as a mode setting operation section for selecting the desired driving assistance mode from the plural driving assistance modes. The driver operation section 35 is provided with an ISA switch 36a for setting a speed limit mode; a TJA switch 36b for setting a preceding vehicle following mode; an ACC switch 36c for setting an automatic speed control mode; and an LAS switch 36d for setting a lane-keeping control mode. The driver operation section 35 further includes: a distance setting switch 37a for setting an inter-vehicle distance (substantially an inter-vehicle time that replaces the inter-vehicle distance) in the preceding vehicle following mode; and a vehicle speed setting switch 37b for setting a vehicle speed in the automatic speed control mode and the like.

The ECU 10, which is illustrated in FIG. 1A, can be constructed of a computer that includes a processor, memory for storing various programs, an input/output device, and the like. The ECU 10 can be configured to be able to output request signals to the engine control system 31, the brake control system 32, and the steering control system 33 on the basis of a driving assistance mode selection signal and a set vehicle speed signal received from the driver operation section 35 as well as on the basis of signals received from the plural sensors and switches, and the request signal can be used to appropriately actuate respective one of an engine system, a brake system, and a steering system.

The in-vehicle camera 21 captures an image around the vehicle 1 and outputs captured image data. Based on the image data, the ECU 10 identifies objects (for example, a vehicle, a pedestrian, a road, road marking lines (a lane divider, a white line, and a yellow line), a traffic signal, a traffic sign, a stop line, an intersection, an obstacle, and the like). Furthermore, in this embodiment, as the in-vehicle camera 21, an in-cabin camera that captures an image of the driver during driving of the vehicle is also provided. The ECU 10 may acquire information on the object from the outside via in-vehicle communication equipment through a traffic infrastructure, inter-vehicle communication, or the like.

The millimeter-wave radar 22 is measuring equipment that measures positions and speeds of the objects (in particular, a preceding vehicle, a parked vehicle, the pedestrian, the obstacle, and the like), transmits a radio wave (a transmitted wave) toward the front of the vehicle 1, and receives a reflected wave that is generated when the object reflects the transmitted wave. Then, based on the transmitted wave and the received wave, the millimeter-wave radar 22 measures a distance between the vehicle 1 and the object (for example, the inter-vehicle distance) and a relative speed of the object to the vehicle 1. In this embodiment, it may be configured to measure the distance from and the relative speed of the object by using a laser radar, an ultrasonic sensor, or the like instead of the millimeter-wave radar 22. Alternatively, the plural sensors may be used to constitute a position and speed measuring equipment.

The vehicle speed sensor 23 detects an absolute speed of the vehicle 1.

The acceleration sensor 24 detects acceleration (longitudinal acceleration in a longitudinal direction and lateral acceleration in a lateral direction) of the vehicle 1. The acceleration includes a speed-increasing side (positive) and a speed-reducing side (negative).

The yaw rate sensor 25 detects a yaw rate of the vehicle 1.

The steering angle sensor 26 detects a rotation angle (a steering angle) of a steering wheel for the vehicle 1.

The accelerator sensor 27 detects a depression amount of an accelerator pedal.

The brake sensor 28 detects a depression amount of a brake pedal.

The positioning system 29 is a global navigation satellite system (GNSS) and/or a gyroscopic system, and detects the position of the vehicle 1 (current vehicle position information). The positioning system 29 may further include position information acquisition means using dead reckoning and road-vehicle communication (using Wi-Fi or the like).

The navigation system 30 stores map information therein and can provide the map information to the ECU 10. Based on the map information and the current vehicle position information, the ECU 10 identifies the road, the intersection, the traffic signal, a building, and the like that exist around (particularly, ahead in an advancing direction of) the vehicle 1. The map information may be stored in the ECU 10.

The engine control system 31 is a controller that controls an engine of the vehicle 1. When the vehicle 1 has to be accelerated or decelerated, the ECU 10 outputs an engine output change request signal to the engine control system 31 so as to request changing of the engine output.

The brake control system 32 is a controller that controls a brake system of the vehicle 1. When the vehicle 1 has to be decelerated, the ECU 10 outputs a brake request signal to the brake control system 32 so as to request generation of a braking force on the vehicle 1.

The steering control system 33 is a controller that controls a steering system of the vehicle 1. When the advancing direction of the vehicle 1 has to be changed, the ECU 10 outputs a steering direction change request signal to the steering control system 33 so as to request changing of a steering direction.

As illustrated in FIG. 2, the ECU 10 can include a single CPU or the single processor that functions as an input processing section 10a, a peripheral target detection section 10b, a target travel route calculation section 10c, a driving operation determination section 10e, and a control target calculation section 10f. Although the single CPU is configured to implement the plural functions in this embodiment, embodiments of the present disclosure are not limited thereto. The plural CPUs may be configured to implement some or all of these functions.

The input processing section 10a is configured to process input information received from various sensor/switch groups including the in-vehicle camera 21 and from the driver operation section 35. This input processing section 10a functions as an image analysis section that analyzes the image captured by the camera 21, which captures an image of a travel road surface, and detects a travel lane in which the vehicle 1 is travelling (the road marking lines on both sides of the lane).

The peripheral target detection section 10b is configured to detect a peripheral target on the basis of the input information from the millimeter-wave radar 22, the camera 21, and the like.

The target travel route calculation section 10c is configured to calculate a target travel route for the vehicle on the basis of the input information from the millimeter-wave radar 22, the in-vehicle camera 21, the sensor group, and the like.

The driving operation determination section 10e can be configured to prioritize an operation by an occupant and output the request signal corresponding to the operation by the occupant to each of the control systems 31 to 33 in the case where the occupant operates the accelerator pedal, the brake pedal, or the steering wheel when automatic speed control and/or automatic steering control is executed as the driving assistance control. That is, with the driving operation determination section 10e, the occupant can override the automatic driving assistance control, and can thereby perform a driving operation by himself/herself.

The control target calculation section 10f can be configured to correct the target travel route, which can be calculated by the target travel route calculation section 10c, calculate a correction travel route, and output the request signal to each of the control systems 31 to 33 on the basis of this correction travel route.

For example, in the case where the peripheral target detection section 10b detects the peripheral target to be avoided, the control target calculation section 10f corrects the target travel route and calculates the correction travel route. In addition, in the case where the target travel route itself is changed due to a change of the driving assistance mode, the control target calculation section 10f can also correct a new target travel route and calculates the correction travel route. By traveling on this correction travel route, the vehicle 1 can merge into the new target travel route. That is, the correction travel route in this case can be a transitional route for adapting the current vehicle behavior (the steering angle, the acceleration, and the like) to the vehicle behavior on the new target travel route.

The control target calculation section 10f can use a specified evaluation function to calculate the correction travel route. The control target calculation section 10f can evaluate plural candidate travel routes by using the evaluation function with the target travel route as a reference, and calculate the single correction travel route that is optimized to satisfy a specified constraint condition (or a restriction condition). In this embodiment, the evaluation function and the constraint condition can be appropriately set on the basis of the selected driving assistance mode, the peripheral target, and the like.

In order to make the vehicle 1 travel on the optimum correction travel route, which can be determined by the control target calculation section 10f, the ECU 10 generates and outputs the request signal to at least one or more of the engine control system 31, the brake control system 32, and the steering control system 33.

Next, a description will be made on the driving assistance modes provided in the vehicle control apparatus 100 according to one or more embodiments of the present disclosure. Here, as the driving assistance mode, five modes (the lane-keeping control mode, the preceding vehicle following mode, the automatic speed control mode, the speed limit mode, and a basic control mode) can be provided.

<Lane-Keeping Control Mode>

The lane-keeping control mode can be a mode in which steering control is executed to make the vehicle 1 travel near a center of the lane, and can be accompanied by the automatic steering control and automatic speed control (engine control and brake control) by the vehicle control apparatus 100.

In this embodiment, when the lane-keeping control mode is selected (that is, in a state where the LAS switch 36d is operated or pressed), different control can be executed depending on whether both lane ends of the travel lane can be detected. That is, while detecting both of the lane ends, the ECU 10 executes the steering control and the speed control such that the vehicle 1 travels near the center of the travel lane. However, in the case where both of the lane ends are not detected, the driving assistance mode can be switched to the basic control mode (an off mode). In the basic control mode, the driver can perform a steering operation, an accelerator operation, and a brake operation.

Here, both of the lane ends are both of the ends of the lane in which the vehicle 1 travels (the road marking line such as the white line, a road end, a curbstone, a median strip, a guard rail, or the like), are boundaries between the travel lane and an adjacent lane, a sidewalk, or the like. The ECU 10 can detect both of these lane ends from the image data, which is acquired by the in-vehicle camera 21. Alternatively, the ECU 10 may detect both of the lane ends from the map information in the navigation system 30.

<Preceding Vehicle Following Mode>

The preceding vehicle following mode can be a mode in which the vehicle 1 follows a travel path of the preceding vehicle while a specified inter-vehicle distance or a specified inter-vehicle time between the vehicle 1 and the preceding vehicle, which corresponds to the vehicle speed, can be maintained, and can be accompanied by the automatic steering control and the automatic speed control (the engine control and the brake control) by the vehicle control apparatus 100.

In this embodiment, the ECU 10 detects the preceding vehicle from the image data, which is acquired by the in-vehicle camera 21, and measurement data, which is acquired by the millimeter-wave radar 22. More specifically, the ECU 10 detects, as a traveling vehicle, another vehicle that travels in front from the image data acquired by the in-vehicle camera 21. Furthermore, in this embodiment, in the case where the inter-vehicle distance between the vehicle 1 and the other vehicle is equal to or shorter than a specified distance (for example, 400 to 500 m) from the measurement data acquired by the millimeter-wave radar 22, the other vehicle is detected as the preceding vehicle. Alternatively, the in-vehicle camera 21 and/or the millimeter-wave radar 22 may detect the preceding vehicle and output preceding vehicle information including a position and the like of the preceding vehicle to the ECU 10.

In this embodiment, when the preceding vehicle following mode is selected (that is, in a state where the TJA switch 36b is operated or pressed), different control can be executed depending on whether the preceding vehicle can be detected. That is, while detecting the preceding vehicle, the ECU 10 can execute the steering control and the speed control such that the vehicle 1 travels by following the preceding vehicle. However, while the preceding vehicle is not detected, the ECU 10 can execute the speed control such that the vehicle 1 travels at a set vehicle speed (a constant speed) as a target speed, and the driver performs the steering operation. For example, the vehicle speed setting switch 37b can set the set vehicle speed. Alternatively, while the preceding vehicle is not detected, the driving assistance mode can be switched to the basic control mode (the off mode).

Furthermore, it may be configured that, in the alternative preceding vehicle following mode, different control can be executed depending on whether both of the lane ends and the preceding vehicle can be detected. For example, in the alternative preceding vehicle following mode, in the case where both of the lane ends and the preceding vehicle are detected, the ECU 10 can execute the steering control and the speed control such that the vehicle 1 travels near the center of the travel lane while maintaining the specified inter-vehicle distance from the preceding vehicle instead of traveling by following the travel path of the preceding vehicle. In the case where the preceding vehicle is detected, but both of the lane ends are not detected, the ECU 10 can execute the steering control and the speed control such that the vehicle 1 travels by following the travel path of the preceding vehicle. Furthermore, in the case where both of the lane ends are detected, but the preceding vehicle is not detected, the ECU 10 can execute the steering control and the speed control such that the vehicle 1 travels near the center of the travel lane at the set vehicle speed. Moreover, in the case where neither the preceding vehicle nor both of the lane ends is detected, the ECU 10 can execute the speed control such that the vehicle 1 travels at the set vehicle speed, and the driver performs the steering operation.

<Automatic Speed Control Mode>

The automatic speed control mode can be a mode in which the speed control is executed to maintain a specified set vehicle speed (the constant speed), which is set in advance by the driver using the vehicle speed setting switch 37b, as the target speed, and is accompanied by the automatic speed control (the engine control and the brake control) by the vehicle control apparatus 100. However, the steering control may not be executed. In this automatic speed control mode, the vehicle 1 travels in a manner to maintain the set vehicle speed. However, the vehicle speed is possibly increased to exceed the set vehicle speed when the driver depresses the accelerator pedal. Meanwhile, when the driver performs the brake operation, the driver's intention is prioritized, and the vehicle speed is reduced from the set vehicle speed. In addition, in the case where the vehicle 1 catches up with the preceding vehicle, the speed control can be executed such that the vehicle 1 follows the preceding vehicle while maintaining the inter-vehicle distance or the inter-vehicle time, which corresponds to the vehicle speed. Then, when the preceding vehicle no longer exists, the speed control can be executed such that the vehicle speed is resumed to the set vehicle speed.

<Speed Limit Mode>

The speed limit mode can be a mode in which the speed control is executed to prevent the vehicle speed of the vehicle 1 from exceeding a speed limit, which is indicated by a speed sign, or the set vehicle speed, which is set by the driver, and is accompanied by the automatic speed control (the engine control) by the vehicle control apparatus 100. However, the steering control may not be executed. The speed limit may be identified when the ECU 10 executes image recognition processing on the speed sign, an image of which is captured by the in-vehicle camera 21, or the image data on a speed display on the road surface. Alternatively, the speed limit may be received from the outside through wireless communication. In the speed limit mode, even in the case where the driver depresses the accelerator pedal such that the vehicle speed exceeds the speed limit, the vehicle speed of the vehicle 1 can be only increased up to the speed limit.

<Basic Control Mode>

The basic control mode can be a mode (the off mode) at the time when the driver operation section 35 selects none of the driving assistance modes, and the automatic steering control and the automatic speed control by the vehicle control apparatus 100 are not executed.

Next, a description will be made on the target travel route that is calculated by the vehicle control apparatus 100 according to one or more embodiments of the present disclosure. In this embodiment, the target travel route calculation section 10c provided in the ECU 10 can be configured to calculate the following first travel route R1 to third travel route R3 in a temporally repeated manner (for example, every 0.1 second). In this embodiment, the ECU 10 can calculate a travel route from a current time point to a time at which a specified prediction period (for example, five seconds) elapses on the basis of the information from the sensors and the like. The travel route Rx (x=1, 2, 3) is identified by using a target position (Px_k) and a target speed (Vx_k) of the vehicle 1 on the travel route, which is set in a specified set elapsed time (k=0, 1, 2, . . . , n). Furthermore, at each of the target positions, in addition to the target speed, target values of plural variables (the acceleration, jerk, the yaw rate, the steering angle, a vehicle angle, and the like) can be identified.

Each of the first travel route R1 to the third travel route R3 can be calculated on the basis of a shape of the travel road, the travel path of the preceding vehicle, travel behavior of the vehicle 1, and the set vehicle speed without considering peripheral target detection information on the peripheral target (the obstacle such as the parked vehicle or the pedestrian) on the travel road, on which the vehicle 1 travels, or around the travel road. Just as described, in this embodiment, since the information on the peripheral target is not considered for the calculation, it can be possible to suppress an overall calculation load of these plural travel routes to be small.

(First Travel Route)

The first travel route R1 can be set according to the road shape only for a specified period such that the vehicle 1 keeps traveling in the travel lane. In detail, the first travel route R1 can be set essentially such that the vehicle 1 keeps traveling near the center of the lane.

The target travel route calculation section 10c can execute the image recognition processing on the image data around the vehicle 1, which is captured by the in-vehicle camera 21, so as to detect both of the lane ends. As described above, each of the lane ends can be the road marking line (the white line or the like), a road shoulder, or the like. The target travel route calculation section 10c sets plural target positions P1_k on the first travel route R1 such that a central portion in a width direction (for example, a position of center of gravity) of the vehicle 1 passes a central portion in a width direction between both of the lane ends. A target speed V1_k at each of the target positions P1_k on the first travel route R1 can essentially set to a speed that is set by the driver using the vehicle speed setting switch 37b in the driver operation section 35, or is set to the specified set vehicle speed (the constant speed) that is set in advance by the vehicle control apparatus 100.

(Second Travel Route)

The second travel route R2 can be set only for the specified period such that the vehicle 1 follows the travel path of the preceding vehicle. The target travel route calculation section 10c acquires the preceding vehicle information (the position, a speed, acceleration, and the like of the preceding vehicle) on the basis of the image data, which is acquired by the in-vehicle camera 21, the measurement data, which is acquired by the millimeter-wave radar 22, and the vehicle speed of the vehicle 1, which is acquired by the vehicle speed sensor 23. Then, based on the preceding vehicle information, the target travel route calculation section 10c estimates or predicts travel behavior of the preceding vehicle in the future specified period. More specifically, the target travel route calculation section 10c assumes, as the predictive travel behavior of the preceding vehicle, that the preceding vehicle travels from current time to the specified period while maintaining the current travel behavior.

Then, the target travel route calculation section 10c calculates the second travel route R2 (a target position P2_k and a target speed V2_k) on the basis of the predictive travel behavior of the preceding vehicle such that the vehicle 1 maintains the inter-vehicle distance from the preceding vehicle (in reality, the inter-vehicle time with the preceding vehicle) according to the speed of the vehicle 1 at a position behind the preceding vehicle.

(Third Travel Route)

The third travel route R3 can be set only for the specified period on the basis of a current steering angle δ and a current speed V of the vehicle 1. That is, the third travel route R3 can be set such that the vehicle 1 turns a steady circle while maintaining the current steering angle δ and a current speed V. Accordingly, a target speed V3_k on the third travel route R3 is set to the current speed V, and a target position P3_k thereon is set at a passing position in the specified set elapsed time in the case where the vehicle 1 travels on a circular route at the speed V.

Next, a description will be made on a relationship between each of the driving assistance modes in the vehicle control apparatus 100 according to one or more embodiments of the present disclosure and the travel route. In this embodiment, it can be configured that, when the driver operates the driver operation section 35 to select one of the driving assistance modes, one of the first to third travel routes can be selected as the target travel route according to the selected driving assistance mode.

In the case where the lane-keeping control mode is selected, and both of the lane ends are detected, the first travel route can be selected. In this case, the set vehicle speed, which is set by using the vehicle speed setting switch 37b, can be the target speed.

In the case where the preceding vehicle following mode is selected, and the preceding vehicle is detected, the second travel route can be selected. In this case, the target speed can be set according to the vehicle speed of the preceding vehicle. Meanwhile, in the case where the preceding vehicle following mode is selected, but the preceding vehicle is not detected, the first or third travel route can be selected depending on whether both of the lane ends can be detected, and the set vehicle speed can be the target speed.

When the automatic speed control mode is selected, the third travel route can be selected. The automatic speed control mode can be the mode in which the speed control is automatically executed as described above, and the set vehicle speed, which is set by using the vehicle speed setting switch 37b, can be the target speed. In addition, the steering control can be executed on the basis of the operation of the steering wheel by the driver.

Also, when the speed limit mode is selected, the third travel route can be selected. The speed limit mode can also be the mode in which the speed control is automatically executed as described above, and the target speed is set according to the depression amount of the accelerator pedal by the driver within a range that is equal to or lower than the speed limit. In addition, the steering control can be executed on the basis of the operation of the steering wheel by the driver.

When the basic control mode (the off mode) is selected, the third travel route can be selected. The basic control mode can be basically similar to a state where the speed limit is not set in the speed limit mode.

Figure 3:
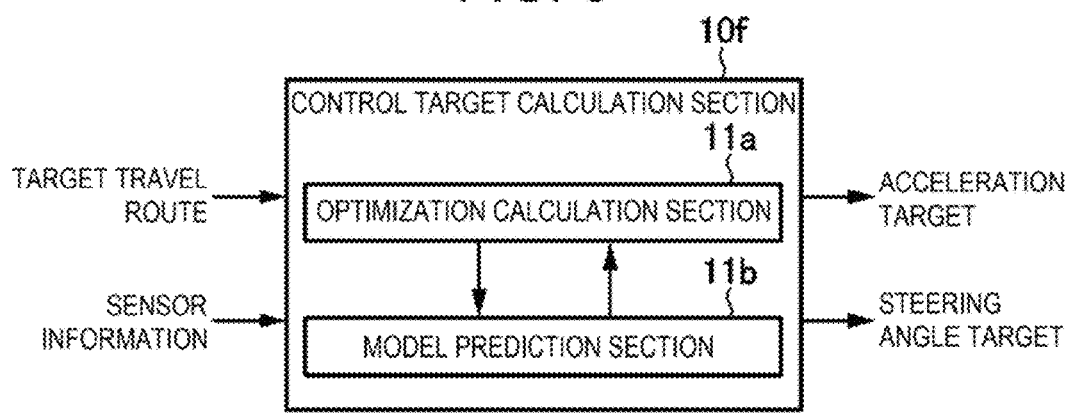
FIG. 3 is an explanatory diagram of control target calculation processing in the vehicle control apparatus according to one or more embodiments of the present disclosure.
Figure 4:
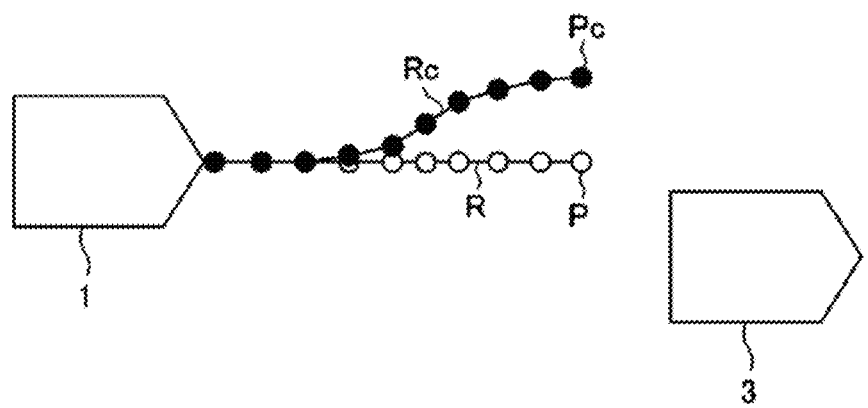
FIG. 4 is an explanatory view of a correction travel route in the vehicle control apparatus according to one or more embodiments of the present disclosure.
Figure 5:
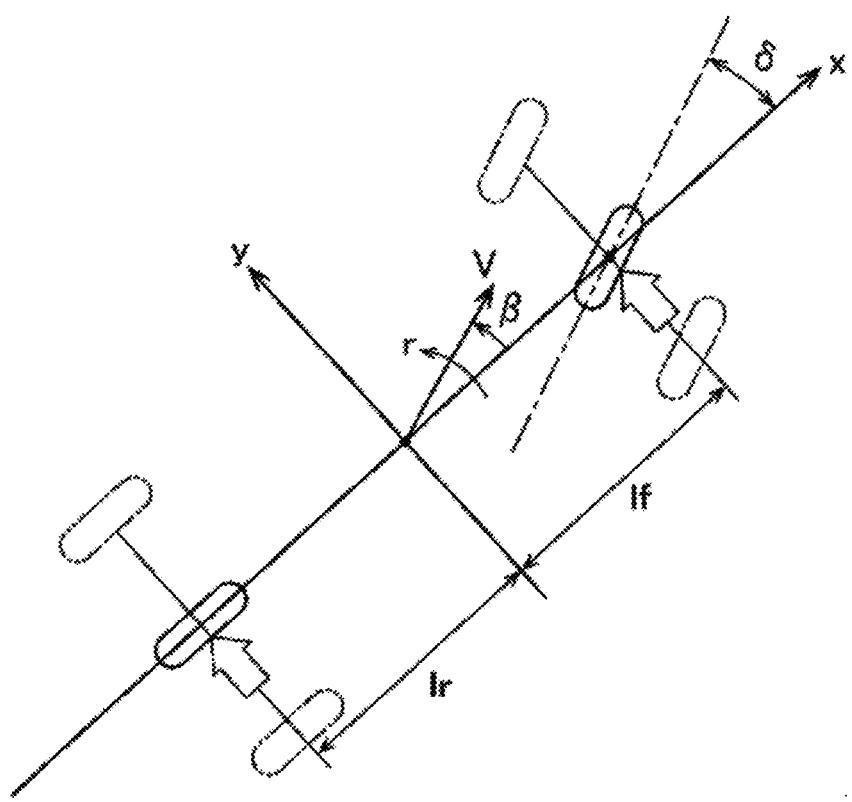
FIG. 5 is an explanatory view of a vehicle model in the vehicle control apparatus according to one or more embodiments of the present disclosure.

Next, a description will be made on control target calculation processing that is executed in the control target calculation section 10f of the ECU 10 according to one or more embodiments of the present disclosure, with reference to FIG. 3 to FIG. 5. FIG. 3 is an explanatory diagram of the control target calculation processing, FIG. 4 is an explanatory view of the correction travel route, and FIG. 5 is an explanatory view of a vehicle model. Here, the control target calculation processing can include travel route correction processing.

As illustrated in FIG. 3 and FIG. 4, the control target calculation section 10f can correct the target travel route R according to external environment (an obstacle 3 or the like) and the change of the driving assistance mode, and calculate a correction travel route Rc. Then, the control target calculation section 10f can calculates control target values (an acceleration target and a steering angle target) of specified control amounts for making the vehicle 1 travel on this correction travel route Rc, and output the request signal to each of the control systems in the vehicle 1 on the basis of the control targets. FIG. 4 illustrates the exemplary target travel route R and the exemplary correction travel route Rc in the specified period (for example, five seconds). A target position P and a correction target position Pc in each of the specified set elapsed times are indicated on each of the routes R, Rc.

More specifically, the control target calculation section 10f receives various types of the information from the sensor/switch group, receives the target travel route R from the target travel route calculation section 10c, and receives the information on the peripheral target from the peripheral target detection section 10b. The control target calculation section 10f executes model prediction control to calculate the correction travel route Rc on the basis of these types of the information. The correction travel route Rc is optimized to reduce a deviation amount from the target travel route R while satisfying the constraint condition (avoidance of a collision with the peripheral target, or the like). That is, according to one or more embodiments, the control target calculation section 10f can have a solver configured to solve such an optimization problem that minimizes an evaluation value of a specified evaluation function J under the constraint condition (or under the restriction condition). For this reason, the control target calculation section 10f can include an optimization calculation section 11a and a model prediction section 11b.

In this embodiment, schematically, the optimization calculation section 11a can set such a candidate correction travel route that avoids the constraint condition (the obstacle or the like) on the basis of the current behavior (the speed, the position, the acceleration, the steering angle, and the like) of the vehicle 1. Then, the optimization calculation section 11a provides, as input values, physical amounts (the acceleration and the steering angle) at each candidate target position on the candidate correction travel route to the model prediction section 11b. The model prediction section 11b applies the input values to the vehicle model so as to calculate the behavior of the vehicle 1 on the candidate correction travel route, identifies the candidate target positions on the candidate correction travel route, and provides feedback about the various physical amounts, which are based on the vehicle behavior, to the optimization calculation section 11a. Each of the candidate target positions can be calculated by integrating a moving distance between each adjacent pair of the candidate target positions.

The vehicle model defines physical motion of the vehicle 1 and can be expressed by the following motion equations. In this example, this vehicle model is a two-wheeled model illustrated in FIG. 5. The physical motion of the vehicle 1 can be defined by the vehicle model.

$$mV\left(\frac{d\beta}{dt}+r\right)=-2K_f\left(\beta+\frac{l_f}{V}r-\delta\right)-2K_r\left(\beta-\frac{l_r}{V}r\right) \tag{1}$$

-continued $$I\frac{dr}{dt} = -2K_f\left(\beta + \frac{l_f}{V}r - \delta\right)l_f + 2K_r\left(\beta - \frac{l_r}{V}r\right)l_r \quad (2)$$

In FIG. 5 and the equations (1), (2), m represents mass of the vehicle 1, I represents yawing inertia moment of the vehicle 1, l represents a wheelbase, $l_f$ represents a distance between a point of center of gravity of the vehicle and a front axle, $l_r$ represents a distance between the point of center of gravity of the vehicle and a rear axle, $K_f$ represents tire cornering power per front wheel, $K_r$ represents the tire cornering power per rear wheel, V represents the vehicle speed of the vehicle 1, δ represents an actual steering angle of the front wheel, β represents a sideslip angle of the point of center of gravity of the vehicle, r represents a yaw angular velocity of the vehicle 1, θ represents a yaw angle of the vehicle 1, y presents lateral displacement of the vehicle 1 with respect to an absolute space, and t represents time.

Based on the feedback that represents the behavior of the vehicle 1 on the candidate correction travel route, the optimization calculation section 11a evaluates the candidate correction travel route by using the evaluation function J. In this embodiment, the evaluation function J can include: an evaluation term JE about evaluation of the correction travel route and a constraint term JC about the constraint condition. The evaluation term JE can have plural evaluation factors. The constraint term JC can have plural constraint factors. The control target calculation section 10f can set the evaluation function J such that the evaluation function J differs by the currently-implemented driving assistance mode, the sensor information, or the like.

The plural evaluation factors can be set in a manner to respectively correspond to the plural physical amounts (for example, the speeds (longitudinal and lateral), the acceleration (longitudinal and lateral), the jerk (longitudinal and lateral), the yaw rate, a lateral position with respect to the center of the lane, the vehicle angle, the steering angle, a steering angular velocity, and other software constraints), each of which represents the behavior of the vehicle 1 at the correction target position. The evaluation factors can include: a first evaluation factor, with which the evaluation is improved as a difference in the physical amount between the target travel route and the correction travel route is reduced; and a second evaluation factor, with which the evaluation is improved as the physical amount itself is reduced. Here, the evaluation can be improved as the evaluation value has a smaller value.

The first evaluation factor can be an evaluation factor for minimizing the difference between the target travel route and the correction travel route, and the physical amounts of the first evaluation factor are, for example, the speeds (longitudinal and lateral), the lateral position, and the like. Meanwhile, the second evaluation factor can be an evaluation factor for minimizing the specified physical amounts, and the physical amounts of the second evaluation factor are, for example, the acceleration (longitudinal and lateral), the jerk (longitudinal and lateral), the steering angle, the steering angular velocity, and the like.

Each of the plural constraint factors can be set in a manner to correspond to respective one of the plural physical amounts. The constraint factor is estimated as a penalty value that corresponds to an amount, by which the physical amount exceeds a limit range (a lower limit value to an upper limit value). The limit range is defined for the corresponding physical amount. Accordingly, as an excess amount is increased, the penalty value can be increased (that is, as a result, the evaluation value can be increased).

For example, the limit range that is essentially fixed is defined for each of the plural physical amounts including the speeds (longitudinal and lateral), the acceleration (longitudinal and lateral), the jerk (longitudinal and lateral), the steering angle, the steering angular velocity, and the yaw rate. However, there is a case where the limit range can be changed to be narrower than the fixed limit range. For example, in the case where speed distribution areas (see FIG. 6), which will be described below, are applied, the limit range of the speed with respect to the target 3 can be changed according to the position of the vehicle 1. In addition, due to the constraint condition that the vehicle 1 does not deviate from the travel lane (that is, the lateral position of the vehicle 1 is within the lane), a limit range of the lateral position can be set within the lane.

The evaluation function J (=JE+JC) can be expressed by the following equations.

$$J = JE + JC$$

$$JE = \sum_{k=1}^{N}\left[CE_k\{W_1(X_1 - X_{ref1})^2 + W_2(X_2 - X_{ref2})^2 + \ldots + W_n(X_n - X_{refn})^2\}\right]$$

$$JC = \sum_{k=1}^{N}[CC_k \times \text{constraint}]$$

In regard to the evaluation term JE, in the equation, $W_k(X_k - X_{refk})^2$ is the evaluation factor, $X_k$ is the physical amount on the correction travel route, $X_{refk}$ is the physical amount or zero (a zero value) on the target travel route, and $W_k$ is a weight coefficient (for example, $0 \leq W_k \leq 1$) of the evaluation factor (however, k=1 to n). In regard to the physical amount of each of the n number of the evaluation factors, a difference is acquired by subtracting the physical amount on the target travel route (in the case of the evaluation factor that minimizes the difference from the target travel route) or the zero value (in the case of the evaluation factor that minimizes the physical amount itself) from the physical amount on the candidate correction travel route. Then, the difference is squared and then weighted. Thereafter, the differences that have been squared and weighted are further weighted and added for a travel route length in the specified period (for example, five seconds). The evaluation term JE in this embodiment corresponds to such a value. Here, the weight coefficient $W_k$ can be set to differ by the driving assistance mode.

Meanwhile, the constraint term JC can correspond to a value that is acquired by adding sums of the evaluation values, which correspond to the excess amounts from the limit ranges of the plural physical amounts, for the travel route length in the specified period (for example, five seconds). Each of the evaluation values can be set as a value that is acquired by multiplying a square of the excess amount by the specified weight coefficient W, for example. The limit range of the specified physical amount can possibly fluctuate according to the peripheral target or the like.

As described above, each of the evaluation term JE and the constraint term JC can be a sum that is calculated when the weighted evaluation values of all the evaluation factors or all the constraint factors at each of the prediction points (or the correction target position) are weighted by a weight coefficient $CE_k$, $CC_k$ (k=1 to N) and added for all the prediction points (k=1 to N).

In this embodiment, the evaluation function J can be a Lagrangian function in which the constraint term JC is incorporated. Accordingly, the optimization calculation section 11a can be configured to solve the unconstrained optimization problem and can derive an optimum answer with favorable convergence. In the case where the evaluation function J does not include the constraint term Jc, and the feedback from the model prediction section 11b does not satisfy the constraint condition, such feedback does not contribute to the convergence of the optimization problem at all. In this case, the optimum answer may not be acquired within a specified calculation time.

Furthermore, in this embodiment, even in the case where the feedback does not completely satisfy the constraint condition, the optimization calculation section 11a can evaluate the candidate correction travel route by using the evaluation function J in consideration of the constraint condition. In this way, in this embodiment, the convergence can be improved. For example, it can be possible to reliably evaluate such a candidate correction travel route that slightly exceeds the constraint condition due to a noise error in the sensor information or the like, an error in evaluation of road environment, an error caused by a model function, or the like. However, in this embodiment, when the weight coefficient for the constraint term JC is set to a large value, the constraint term JC can reliably function as the constraint condition.

In this embodiment, the optimization calculation section 11a can calculate the evaluation value for the candidate correction travel route by using the evaluation function J on the basis of the feedback from the model prediction section 11b. The optimization calculation section 11a can set a new candidate correction travel route according to the evaluation value, and provides the corrected input values to the model prediction section 11b on the basis of this new candidate correction travel route. In this embodiment, such feedback can be repeatedly made for plural times between the optimization calculation section 11a and the model prediction section 11b. In this way, the correction travel route Rc, for which the evaluation value of the evaluation function J is minimized (or optimized), can be calculated. Here, the maximum repeated number of the feedback may be limited to specified number of times.

Figure 6:
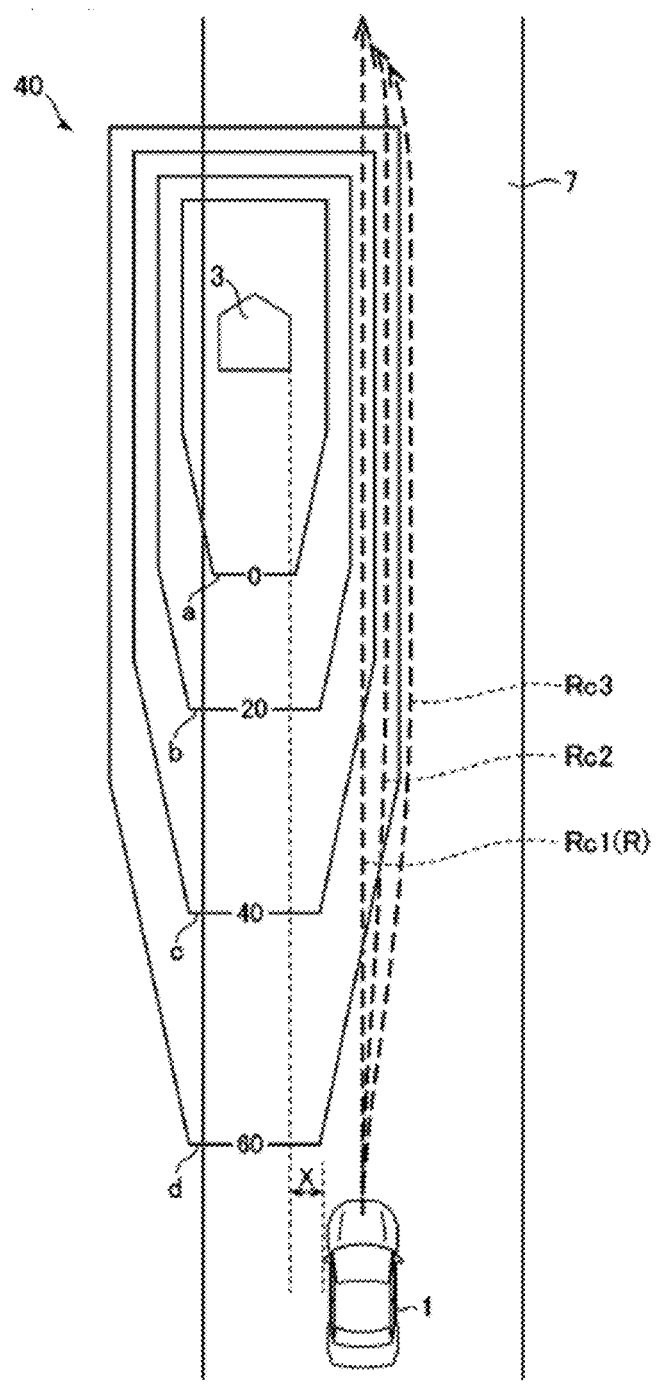
FIG. 6 is an explanatory view of avoidance of an obstacle by correction of a target travel route in the vehicle control apparatus according to one or more embodiments of the present disclosure.
Figure 7:
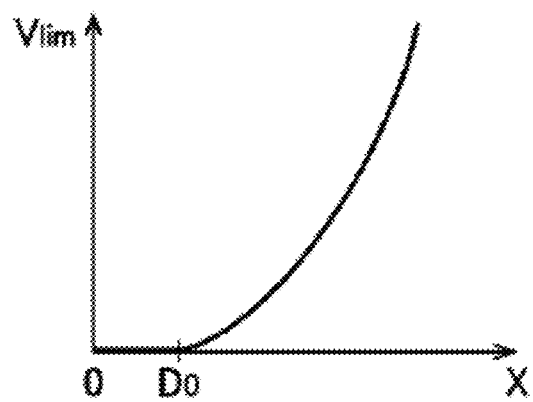
FIG. 7 is an explanatory graph illustrating a relationship between an allowable upper limit value of a pass-by speed and a clearance between the obstacle and a vehicle at the time of avoiding the obstacle in the vehicle control apparatus according to one or more embodiments of the present disclosure.

Next, a description will be made on obstacle avoidance processing according to this embodiment with reference to FIG. 6 to FIG. 7. FIG. 6 is an explanatory view of avoidance of the obstacle by correction of the target travel route, and FIG. 7 is an explanatory graph illustrating a relationship between an allowable upper limit value of a pass-by speed and a clearance between the obstacle and the vehicle at the time of avoiding the obstacle. In FIG. 6, the vehicle 1 travels on a travel road (a lane) 7, passes by a traveling or stopped vehicle 3, and attempts to move ahead the vehicle 3.

In general, when passing by the obstacle (for example, the preceding vehicle, the parked vehicle, the pedestrian, or the like) on the road or near the road, the driver of the vehicle 1 maintains a specified clearance or a specified gap (a lateral distance) between the vehicle 1 and the obstacle in the lateral direction, which is orthogonal to the advancing direction, and decelerates the vehicle 1 to the speed at which the driver of the vehicle 1 feels safe. More specifically, in order to avoid such danger that the preceding vehicle abruptly changes a course, that the pedestrian runs into the road from a blind spot behind the obstacle, or that a door of the parked vehicle is opened, a relative speed to the obstacle can be reduced as the clearance is reduced.

In addition, in general, when approaching the preceding vehicle from behind, the driver of the vehicle 1 adjusts the speed (the relative speed) according to the inter-vehicle distance along the advancing direction (the longitudinal distance). More specifically, when the inter-vehicle distance is long, an approach speed (the relative speed) can be maintained to be high. However, when the inter-vehicle distance is reduced, the approach speed can be reduced to a low speed. Then, the relative speed between both of the vehicles can become zero with the specified inter-vehicle distance. The same can apply to a case where the preceding vehicle is the parked vehicle.

As described above, the driver drives the vehicle 1 to avoid the danger while considering the relationship between the relative speed and the distance (including the lateral distance and the longitudinal distance) between the obstacle and the vehicle 1.

Accordingly, in this embodiment, as illustrated in FIG. 6, the vehicle 1 can be configured to set two-dimensional distribution (a speed distribution area 40) with respect to the obstacle (for example, the parked vehicle 3), which detected from the vehicle 1, around the obstacle (in a lateral region, a rear region, and a front region) or at least between the obstacle and the vehicle 1. The two-dimensional distribution (a speed distribution area 40) can define an allowable upper limit value of the relative speed in the advancing direction of the vehicle 1. In the speed distribution area 40, an allowable upper limit value $V_{lim}$ of the relative speed can be set at each point around the obstacle.

As it is understood from FIG. 6, the speed distribution area 40 can be essentially set such that the allowable upper limit value of the relative speed is reduced as the lateral distance and the longitudinal distance from the obstacle are reduced (as approaching the obstacle). In addition, in order to facilitate understanding, FIG. 6 illustrates constant relative speed lines, each of which is drawn by connecting points having the same allowable upper limit value. The constant relative speed lines a, b, c, d respectively correspond to 0 km/h, 20 km/h, 40 km/h, and 60 km/h of the allowable upper limit values $V_{lim}$. In this example, each of constant relative speed areas can be set in a substantially rectangular shape.

In one or more embodiments, in each of the driving assistance modes, the target travel route can be corrected such that the relative speed of the vehicle 1 to the obstacle does not exceed the allowable upper limit value $V_{lim}$ in the speed distribution area 40. That is, the speed distribution area 40 can serve as the constraint condition for the speed of the vehicle 1. More specifically, when the peripheral target detection section 10b detects the obstacle (the peripheral target) to be avoided, the control target calculation section 10f can set the speed distribution area 40 with respect to the obstacle. Then, the control target calculation section 10f corrects the target travel route R, which is calculated by the target travel route calculation section 10c, and calculates the correction travel route Rc such that the relative speed of the vehicle 1 to the obstacle does not exceed the allowable upper limit value $V_{lim}$, which is defined by the speed distribution area 40. FIG. 6 illustrates exemplary correction travel routes Rc1, Rc2, Rc3.

The speed distribution area 40 may not always have to be set around an entire perimeter of the obstacle and may only need to be set at least behind the obstacle and on one side in the lateral direction of the obstacle where the vehicle 1 exists (in FIG. 6, a right area of the vehicle 3).

As illustrated in FIG. 7, in the case where the vehicle 1 travels at the certain absolute speed, the allowable upper limit value $V_{lim}$, which is set in the lateral direction of the obstacle, is 0 km/h up to $D_0$ (a safe distance) of a clearance X and is increased in quadratic fashion with the larger clearance X than $D_0$. ($V_{lim}=k(X-D_0)^2$. However, $X \geq D_0$). That is, in order to secure safety, when the clearance X is equal to or smaller than $D_0$, the relative speed of the vehicle 1 can be zero. Meanwhile, when the clearance X is larger than $D_0$, the vehicle 1 can be allowed to pass by the obstacle at the higher relative speed as the clearance X is increased.

In the example illustrated in FIG. 7, the allowable upper limit value in the lateral direction of the obstacle can be defined as $V_{lim}=f(X)=k(X-D_0)^2$. Here, k is a gain coefficient that is associated with a degree of change in $V_{lim}$ with respect to X, and is set depending on a type or the like of the obstacle. In addition, $D_0$ can also be set depending on the type or the like of the obstacle.

In this embodiment, $V_{lim}$ is defined as a quadratic function of X. However, embodiments of the present disclosure are not limited thereto, and $V_{lim}$ may be defined as another function (for example, a linear function or the like). In addition, the description has been made on the allowable upper limit value $V_{lim}$ in the lateral direction of the obstacle. However, the allowable upper limit value $V_{lim}$ can be set in a similar manner in an entire radial direction including the longitudinal direction of the obstacle. At this time, the coefficient k and the safe distance $D_0$ can be set according to a direction from the obstacle.

The speed distribution area 40 can be set on the basis of various parameters. Examples of the parameters are the relative speed between the vehicle 1 and the obstacle, the type of the obstacle, the advancing direction of the vehicle 1, a moving direction and a moving speed of the obstacle, a length of the obstacle, and the absolute speed of the vehicle 1. That is, the coefficient k and the safe distance $D_0$ can be selected on the basis of these parameters.

In this embodiment, the obstacle can include the vehicle, the pedestrian, a bicycle, a cliff, a groove, a hole, a dropped object, and the like. In addition, the vehicle can further be divided into an automobile, a truck, a two-wheeled motor vehicle. The pedestrian can further be divided into an adult, a child, and a group.

As illustrated in FIG. 6, when the vehicle 1 travels on the travel road 7, the peripheral target detection section 10b that is installed in the ECU 10 of the vehicle 1 detects the obstacle (the vehicle 3) on the basis of the image data from the in-vehicle camera 21. At this time, the type of the obstacle (in this case, the vehicle or the pedestrian) is identified.

In addition, the peripheral target detection section 10b calculates the position, a relative speed, and an absolute speed of the obstacle (the vehicle 3) with respect to the vehicle 1 on the basis of the measurement data from the millimeter-wave radar 22 and the vehicle speed data from the vehicle speed sensor 23. The position of the obstacle includes a position in an x-direction along the advancing direction of the vehicle 1 (the longitudinal distance) and a position in a y-direction along the lateral direction that is orthogonal to the advancing direction (the lateral distance).

The control target calculation section 10f can set the speed distribution area 40 for each of all the detected obstacles (in the case of FIG. 3, the vehicle 3). Then, the control target calculation section 10f can correct the target travel route R such that the speed of the vehicle 1 does not exceed the allowable upper limit value $V_{lim}$ in the speed distribution area 40.

More specifically, in the case where the vehicle 1 travels on the target travel route R, and the target speed exceeds the allowable upper limit value, which is defined by the speed distribution area 40, at the certain target position, the target speed can be reduced without changing the target position (the route Rc1 in FIG. 6), the target position can be changed to a bypass route without changing the target speed so as to prevent the target speed from exceeding the allowable upper limit value (the route Rc3 in FIG. 6), or both of the target position and the target speed can be changed (the route Rc2 in FIG. 6).

In general, in regard to the evaluation function J, in the case where the weight coefficient of the evaluation factor for minimizing the steering angular velocity is large, the correction travel route Rc1 can be calculated. In the case where the weight coefficient of the evaluation factors for minimizing the longitudinal acceleration is large, the correction travel route Rc3 can be calculated.

For example, FIG. 6 illustrates a case where the calculated target travel route R is a route on which the vehicle 1 travels at a central position (the target position) in the width direction of the travel road 7 at 60 km/h (the target speed). In this case, the parked vehicle 3 exists ahead as the obstacle. However, as described above, at a calculation stage of the target travel route R, this obstacle may not be considered to reduce the calculation load.

When traveling on the target travel route R, the vehicle 1 sequentially crosses the constant relative speed lines d, c, c, d of the speed distribution area 40. That is, the vehicle 1, which travels at 60 km/h, enters the area on the inside of the constant relative speed line d (the allowable upper limit value $V_{lim}$=60 km/h). Accordingly, the control target calculation section 10f can correct the target travel route R in a manner to limit the target speed at each of the target positions on the target travel route R to be equal to or lower than the allowable upper limit value $V_{lim}$, and thereby can generate the correction travel route Rc1. That is, on the correction travel route Rc1, in order to set the target speed at each of the target positions to be equal to or lower than the allowable upper limit value $V_{lim}$, the target speed can be gradually reduced to be lower than 40 km/h as the vehicle 1 approaches the vehicle 3, and thereafter the target speed can be gradually increased to the original speed of 60 km/h as the vehicle 1 separates from the vehicle 3.

The correction travel route Rc3 can be a route that is set in a manner not to change the target speed (60 km/h) on the target travel route R and thus can be a route on which the vehicle 1 travels on an outer side of the constant relative speed line d (corresponding to the relative speed 60 km/h). In order to maintain the target speed on the target travel route R, the control target calculation section 10f can correct the target travel route R such that the target position is changed to be on the constant relative speed line d or on the outer side thereof, and thereby can generate the correction travel route Rc3. Accordingly, the target speed on the correction travel route Rc3 can be maintained to 60 km/h that is the target speed on the target travel route R.

The correction travel route Rc2 can be a route for which both of the target position and the target speed on the target travel route R are changed. On the correction travel route Rc2, the target speed may not be maintained to 60 km/h, can be gradually reduced as the vehicle 1 approaches the vehicle 3, and can be thereafter gradually increased to the original speed of 60 km/h as the vehicle 1 separates from the vehicle 3.

Like the correction travel route Rc1, such correction that the target position on the target travel route R is not changed and only the target speed thereon is changed can be applied to the driving assistance mode that is accompanied by the speed control but may not be accompanied by the steering control (for example, the automatic speed control mode, the speed limit mode, and the basic control mode).

Meanwhile, like the correction travel route Rc3, such correction that the target speed on the target travel route R is not changed and only the target position is changed can be applied to the driving assistance mode that is accompanied by the steering control (for example, the preceding vehicle following mode).

Furthermore, like the correction travel route Rc2, such correction that both of the target position and the target speed on the target travel route R are changed can be applied to the driving assistance mode that is accompanied by the speed control and the steering control (for example, the preceding vehicle following mode).

Figure 8:
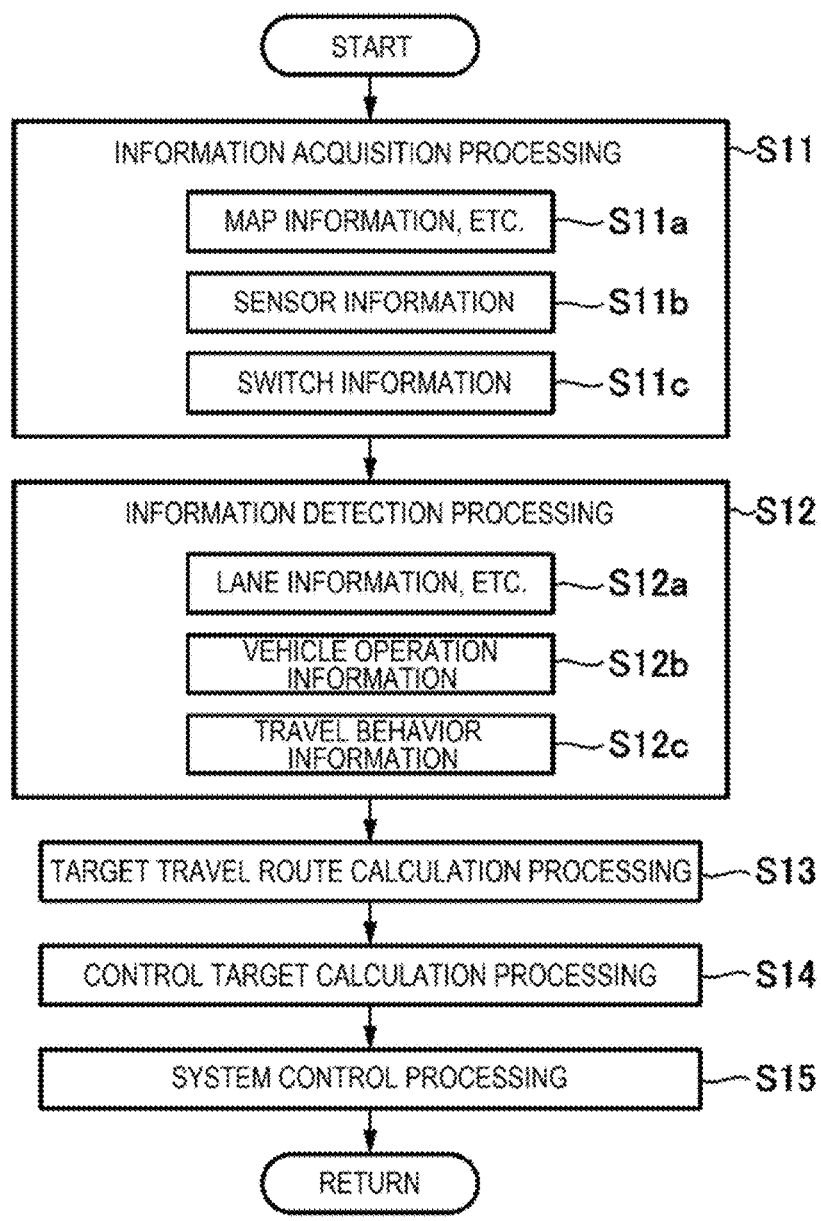
FIG. 8 illustrates a processing flow of driving assistance control in the vehicle control apparatus according to one or more embodiments of the present disclosure.

Next, a description will be made on a processing flow of the driving assistance control in the vehicle control apparatus 100 according to one or more embodiments of the present disclosure with reference to FIG. 8. FIG. 8 illustrates the processing flow of the driving assistance control.

The ECU 10 can repeatedly execute the processing flow in FIG. 8 at specified time intervals (for example, every 0.1 second). First, the ECU 10 (the input processing section 10a) executes information acquisition processing (S11). In the information acquisition processing, the ECU 10 acquires the current vehicle position information and the map information from the positioning system 29 and the navigation system 30 (S11a), acquires the sensor information from the in-vehicle camera 21, the millimeter-wave radar 22, the vehicle speed sensor 23, the acceleration sensor 24, the yaw rate sensor 25, the driver operation section 35, and the like (S11b), and acquires switch information from the steering angle sensor 26, the accelerator sensor 27, the brake sensor 28, and the like (S11c).

Next, the ECU 10 (the input processing section 10a and the peripheral target detection section 10b) executes specified information detection processing by using the various types of the information acquired in the information acquisition processing (S11) (S12). In the information detection processing, the ECU 10 detects, from the current vehicle position information, the map information, and the sensor information, the travel road information (presence or absence of a straight section and a curved section, a length of each of the sections, a curvature radius of the curved section, a lane width, the positions of both of the lane ends, the number of lanes, presence or absence of the intersection, the speed limit determined by the curvature radius, and the like), travel regulation information (the speed limit, a red light, and the like), the preceding vehicle information (the position, the speed, the acceleration, and the like of the preceding vehicle), and the peripheral target information (S12a).

In addition, the ECU 10 detects vehicle operation information related to the operation of the vehicle by the driver (the steering angle, the depression amount of the accelerator pedal, the depression amount of the brake pedal, and the like) from the switch information (S12b), and further detects travel behavior information on the behavior of the vehicle 1 (the vehicle speed, the longitudinal acceleration, the lateral acceleration, the yaw rate, and the like) from the switch information and the sensor information (S12c).

Next, the ECU 10 (the target travel route calculation section 10c) executes target travel route calculation processing on the basis of the information acquired by the calculation (S13). In the target travel route calculation processing, as described above, the first travel route R1, the second travel route R2, and the third travel route R3 can be calculated. Of these, the target travel route R can be selected according to the selected driving assistance mode and the sensor information (the preceding vehicle, both of the lane ends, and the like).

Next, the ECU 10 (the control target calculation section 10f) can execute the control target calculation processing on the basis of the target travel route R, the peripheral target information, the various types of the sensor information, and the like (S14). In the control target calculation processing, as described above, the correction travel route Rc is calculated, and the control targets (the acceleration target and the steering angle target) of the specified control amounts at each of the correction target positions Pc on this correction travel route Rc are generated.

The ECU 10 (the control target calculation section 10f) can execute system control processing on the basis of the control targets in the generated correction travel route Rc (S15), and terminate the processing. In the system control processing, the request signals (the engine request signal, the brake request signal, the steering request signal) can be generated according to the control targets on the correction travel route Rc, and the generated request signals can be output to the control systems 31 to 33 in the vehicle 1.

Figure 9:
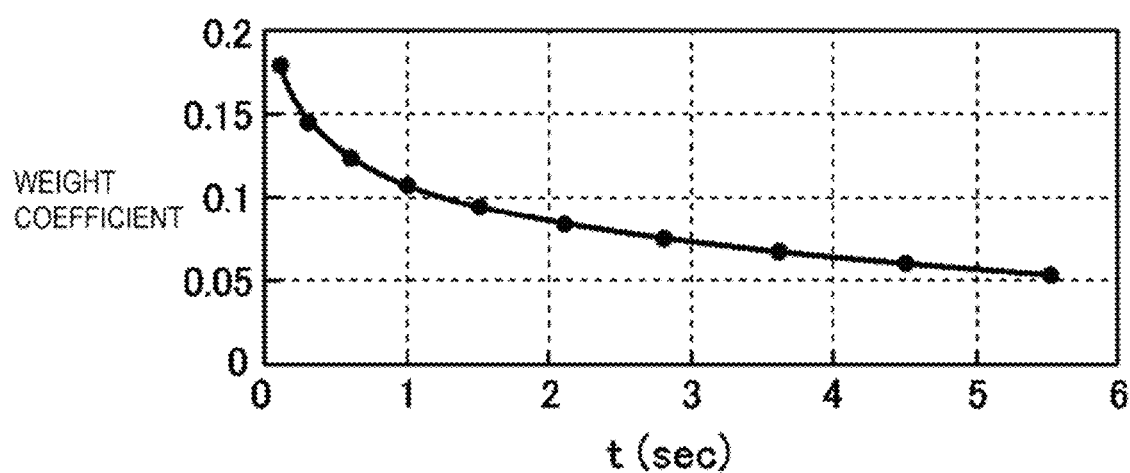
FIG. 9 is a graph of a set elapsed time at a prediction point and a weight coefficient in the vehicle control apparatus according to one or more embodiments of the present disclosure.

Next, a description will be made on setting of the prediction point in the vehicle control apparatus according to one or more embodiments of the present disclosure with reference to FIG. 9 and FIG. 10. FIG. 9 is a graph including the set elapsed time at the prediction point and the weight coefficient, and FIG. 10 is an explanatory view of the correction travel route.

Figure 10:
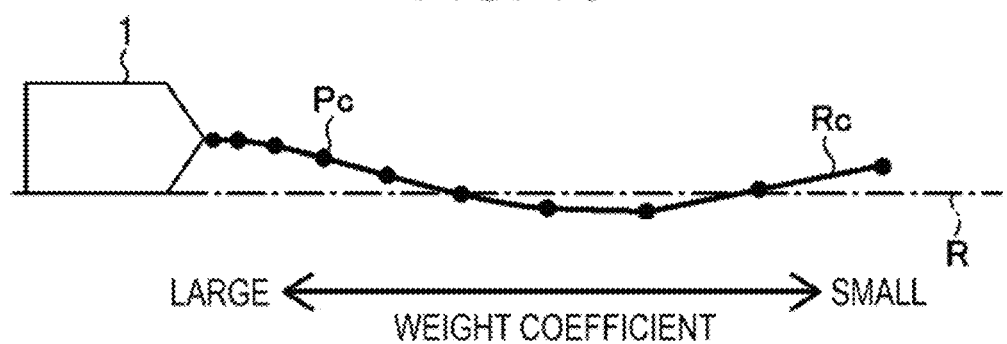
FIG. 10 is an explanatory view of the correction travel route in the vehicle control apparatus according to one or more embodiments of the present disclosure.

As illustrated in FIG. 9 and FIG. 10, in the prediction period from the current time point to the time at which the specified time elapses (approximately five seconds), the plural set elapsed times can be set for the plural prediction points Pc (k=1 to N; N=10).

Here, the plural prediction points Pc may not be set with uniform intervals and can be set such that a time interval between each adjacent pair of the prediction points Pc is increased with time. More specifically, as expressed by the following equations, a set elapsed time $t_k$ in this embodiment can be set such that the set elapsed time tk at a first prediction point Pc is set 0.1 second after the current time point and that the time interval between each adjacent pair of the prediction points Pc thereafter are increased by 0.1 second with time.

$$t_1=0.1$$

$$t_k=t_{k-1}+0.1 \times k (K=2 \text{ to } 10)$$

Thus, the prediction points Pc can be set as the prediction positions of the vehicle 1 that is 0.1, 0.3, 0.6, 1.0, 1.5, 2.1, 2.8, 3.6, 4.5, 5.5 seconds after the current time point (t=0).

As described above, the time interval between the adjacent prediction points can be set to be longer on the prediction point Pc of the farther side. In this way, it can be possible to set the long prediction period as a whole without increasing the number of the prediction points Pc. For example, in the case where the prediction point Pc is set per 0.3 second, and thus a total of the ten prediction points Pc are set, the prediction period is reduced to 3 seconds. Accordingly, by setting the long prediction period, the correction travel route Rc, to which the situation on a far side is reflected, can be calculated without increasing the calculation load.

In addition, each of the weight coefficients $CE_k$, $CC_k$ at each of the prediction points Pc can be set to be proportional to a common logarithm of a value that is inversely proportional to a square of the set elapsed time $t_k$ at each of the prediction points Pc.

$$CE_k = CE \times \log(De/t_k^2)$$

$$CC_k = CC \times \log(Dc/t_k^2)$$

In these equations, each of Ce, Cc, De, Dc is a coefficient (a constant) and determines a curve shape of a graph in FIG. 9. The coefficients Ce, Cc are set such that a sum of the weight coefficients CE, CC becomes 1. In addition, each of the coefficients De, Dc is a parameter that determines a magnitude relationship between the prediction points with each of the weight coefficients $CE_k$, $CC_k$. In this embodiment, a pair of Ce and Cc and a pair of De and Dc each have the same constant (Ce=Cc=C, De=Dc=D). Accordingly, the weight coefficients $CE_k$, $CC_k$ can be the same. Alternatively, at each of the prediction points Pc, the coefficient Cc may be set to be larger than the coefficient Ce (Cc>Ce) such that the weight coefficient $CC_k$ is larger than the weight coefficient $CE_k$ ($CC_k > CE_k$). In this case, in regard to the evaluation function J, the evaluation by the constraint condition (the constraint term JC) can be set to be relatively stricter than that by the evaluation term JE.

When a distance between the driver and the target is increased by n times, the moving speed of the target can become 1/n when seen from the driver. In addition, kinetic energy of the target is proportional to a square of the speed. Thus, when a separated distance is increased by the n times, an amount of a stimulus that the driver receives from the target becomes $1/n^2$. Furthermore, according to the Fechner's law, an amount of psychological sensation given to a person is proportional to a common logarithm of the amount of the stimulus. Moreover, the set elapsed time at each of the prediction points Pc is substantially proportional to a distance from the current position to each of the prediction points Pc.

Accordingly, in regard to the evaluation function J, each of the weight coefficients CE, CC can be set to be proportional to the common logarithm of the value that is inversely proportional to the square of the set elapsed time $t_k$. Thus, it can be possible to calculate the control targets, which can conform to the sensation of the driver, from the correction travel route Rc calculated by using such an evaluation function J.

FIG. 10 illustrates the correction travel route Rc that can be calculated by using the evaluation function J having the weight coefficients CE, CC in this embodiment. In a time axis, the weight coefficients CE, CC can be set to be smaller on the far side than the near side of the vehicle 1. Accordingly, the deviation of the correction travel route Rc from the target travel route R is evaluated to be small at the prediction point Pc on the far side. As a result, the deviation at the prediction point Pc on the far side can have small impact on the route on the near side. Thus, the calculation of such a correction travel route Rc (that requires rapid steering, for example) that lowers the evaluation value at the prediction point Pc on the near side can be prevented. In this way, in this embodiment, it can be possible to calculate the correction travel route Rc that does not give the driver the sense of discomfort while increasing the time interval between the prediction points Pc on the far side.

As illustrated in FIG. 10, the deviation at the prediction point Pc on the far side on the correction travel route Rc can be allowed. However, since the correction travel route Rc is repeatedly calculated in the specified time intervals (for example, every 0.1 second), travel safety of the vehicle 1 on the route on the far side may not be degraded. Rather, the travel safety and travel comfort on the route on the near side can be improved.

Figure 11A:
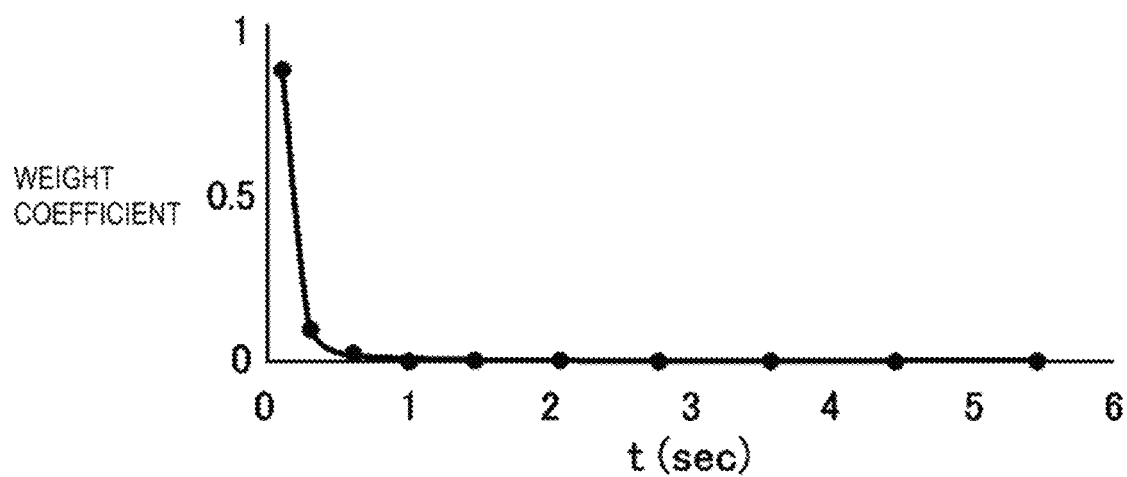
FIG. 11A is a graph of a set elapsed time at a prediction point and a weight coefficient according to a modified example of one or more embodiments of the present disclosure.
Figure 11B:
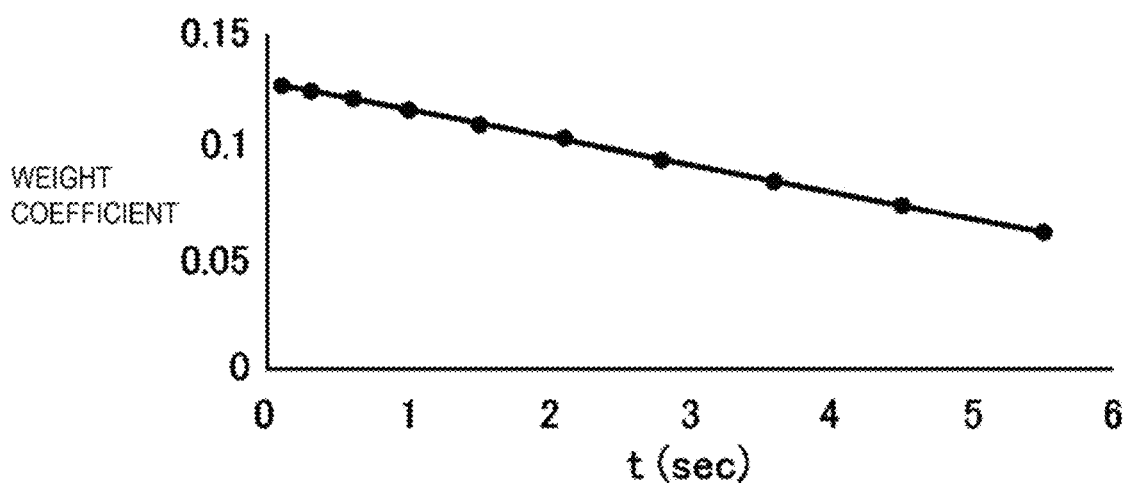
FIG. 11B is a graph of the set elapsed time at the prediction point and the weight coefficient according to the modified example of one or more embodiments of the present disclosure.

Next, a description will be made on setting of a weight coefficient at a prediction point according to a modified example with reference to FIG. 11A and FIG. 11B. Each of FIG. 11A and FIG. 11B is a graph of a set elapsed time at the prediction point and the weight coefficient according to the modified example. In an example illustrated in each of FIG. 11A and FIG. 11B, the set elapsed time $t_k$ at the prediction point Pc can be the same as that in the example illustrated in FIG. 9 ($t_1=0.1$, $t_k=t_{k-1}+0.1 \times k$, k=2 to 10).

In the example illustrated in FIG. 11A, each of the weight coefficients $CE_k$, $CC_k$ at each of the prediction points Pc can be set to be inversely proportional to the square of the set elapsed time $t_k$ at each of the prediction points Pc. Here, the coefficient C1 is a constant, and the sum of the weight coefficients CE, CC is set to be 1.

$$CE_k = CC_k = C1/t_k^2$$

As described above, when the distance between the driver and the target is increased by n times, the moving speed of the target becomes 1/n when seen from the driver. In addition, the kinetic energy of the target is proportional to the square of the speed. Thus, when the separated distance is increased by the n times, the amount of the stimulus that the driver receives from the target can become $1/n^2$. Moreover, the set elapsed time at each of the prediction points Pc is substantially proportional to a distance from the current position to each of the prediction points Pc. Accordingly, in the modified example illustrated in FIG. 11A, the weight coefficients CE, CC of the evaluation function J can be set to be inversely proportional to the square of the set elapsed time $t_k$. In this way, it can be possible to calculate the control targets that conform to the amount of the stimulus that the driver receives from the surrounding environment.

In the example illustrated in FIG. 11B, each of the weight coefficients $CE_k$, $CC_k$ at each of the prediction points Pc is set to be reduced linearly in proportion to the set elapsed time $t_k$ at each of the prediction points Pc (0<C2<1). Here, the coefficient C2 is a constant, and the sum of the weight coefficients CE, CC is set to be 1.

$$CE_k = CC_k = C2 \times t_k$$

Alternatively, in the above embodiment and the modified example, the set elapsed time $t_k$ at the prediction point Pc may be set according to the following equations.

$$t_1 = 0.1, \; t_2 = 0.2$$

$$t_k = t_{k-1} + t_{k-2} \; (k=3 \text{ to } 10)$$

In this example, $t_k$ is set to form the Fibonacci series. Thus, the prediction points Pc are set as the prediction positions of the vehicle 1 that is 0.1, 0.2, 0.3, 0.5, 0.8, 1.3, 2.1, 3.4, 5.5, 8.9 seconds after the current time point.

Next, a description will be made on operational effects of the vehicle control apparatus 100 according to one or more embodiments of the present disclosure.

The vehicle control apparatus 100 for assisting with driving of the vehicle 1 according to one or more embodiments of the present disclosure can be configured to repeatedly execute, in the specified control cycles: the processing to calculate the target travel route R of the vehicle 1; and the processing to calculate the correction travel route Rc on the basis of the target travel route R under the specified constraint condition by using the vehicle model for the estimation of the behavior of the vehicle 1 and to calculate the control target values of the vehicle 1 so as to make the vehicle 1 travel on the correction travel route Rc. When calculating the correction travel route Rc, the vehicle control apparatus 100 can calculate the correction travel route Rc by using the evaluation function J for the evaluation of the correction travel route Rc under the constraint condition in a manner to minimize the difference in the correction travel route Rc from the target travel route R. The correction travel route Rc can include the plural prediction points Pc that the vehicle 1 passes before the lapse of the specified prediction period. The evaluation function J can be a sum that is acquired by weighting the evaluation value at each of the prediction points Pc by the weight coefficients CE, CC, each of which is set for each of the prediction points Pc. The time interval between the adjacent pair of the prediction points Pc of the plural prediction points Pc can be set to be increased from the near side toward the far side from the vehicle 1. The weight coefficients CE, CC, which can be set for each of the prediction points Pc, can be set such that the weight at the prediction point Pc on the far side from the vehicle 1 is less than the weight at the prediction point Pc on the near side of the vehicle 1.

Thus, according to one or more embodiments, the weight at the prediction point Pc on the far side from the vehicle 1 can be set to be less than the weight at the prediction point Pc on the near side of the vehicle 1, and thus the evaluation value at the prediction point Pc on the far side can be estimated to be low. Accordingly, the time interval between the two adjacent prediction points Pc can be set to be increased from the near side toward the far side from the vehicle 1. However, the deviation at the prediction point Pc on the far side, the interval of which is set to be long, can have the small influence on the prediction point Pc on the near side. Thus, it can be possible to calculate the control target that conforms to a driving characteristic of the driver that places emphasis on the travel safety and the travel comfort on the near side of the vehicle 1 and that does not give the driver the sense of discomfort.

In this embodiment, the weight at each of the prediction points Pc can be set to be inversely proportional to the square of the required time (the set elapsed time $t_k$) that is required for the vehicle 1 to arrive at each of the prediction points Pc by using the weight coefficients CE, CC set for each of the prediction points Pc.

In the case where the distance between the driver and the target is increased by n times, the moving speed of the target becomes 1/n when seen from the driver. Thus, the kinetic energy of the target felt by the driver (that is, the amount of the stimulus that the driver receives from the target) can become $1/n^2$. Here, the weight coefficients CE, CC of the evaluation function J can be set on the basis of this characteristic. Thus, it can be possible to calculate the control targets that conform to the amount of the stimulus that the driver receives from the surrounding environment.

In this embodiment, the weight at each of the prediction points Pc can be set to be proportional to the common logarithm of the value that is inversely proportional to the square of the required time (the set elapsed time $t_k$) for the vehicle 1 to arrive at each of the prediction points Pc by the weight coefficients CE, CC that are set for each of the prediction points Pc.

In the case where the distance between the driver and the target is increased by n times, the moving speed of the target becomes 1/n when seen from the driver. Thus, the amount of the stimulus that the driver receives from the target can become $1/n^2$. Furthermore, according to the Fechner's law, the amount of psychological sensation given to the person is proportional to the common logarithm of the amount of the stimulus. Accordingly, the weight coefficients CE, CC of the evaluation function J can be set on the basis of this characteristic. Thus, it can be possible to calculate the control targets that conform to the sensation of the driver.

In this embodiment, at each of the prediction points Pc, the evaluation function J can include: the evaluation term JE for evaluating the correction travel route Rc; and the constraint term JC that lowers the evaluation value when the correction travel route Rc does not satisfy the constraint condition. At each of the prediction points Pc, the weight coefficient CC of the constraint term JC can be set to be greater than the weight coefficient CE of the evaluation term JE. The weight coefficient CC of the constraint term JC can be set such that the weight at the prediction point Pc on the far side from the vehicle 1 is less than the weight at the prediction point Pc on the near side of the vehicle 1.

Thus, in one or more embodiments of the present disclosure, the evaluation function J can include the constraint term JC for calculating the evaluation value related to the constraint condition. Here, the correction travel route Rc can be derived by solving the unconstrained optimization problem. Thus, it can be possible to improve the calculation convergence. In addition, the weight of the constraint term JC can be set to be greater on the near side than on the far side. Thus, it can be possible to prevent the calculation of such an answer that does not satisfy the constraint condition on the near side.

In this embodiment, the vehicle control apparatus 100 can detect the obstacle 3 on the outside of the vehicle 1, and set the speed distribution area 40, which defines the distribution of the allowable upper limit value $V_{lim}$ of the relative speed of the vehicle 1 to the obstacle 3, between the obstacle 3 and the vehicle 1. The allowable upper limit value $V_{lim}$ in this speed distribution area 40 can be set to be increased as the distance from the obstacle 3 is increased. The constraint condition includes that the relative speed of the vehicle 1 to the obstacle 3 does not exceed the allowable upper limit value $V_{lim}$ in the speed distribution area 40. Thus, according to one or more embodiments of the present disclosure, the weight of the constraint term JC can be set to be greater on the near side than on the far side. Thus, it can be possible to calculate the control targets in the manner to conform to the driving characteristic of the driver that prioritizes appropriateness of the positional relationship with the obstacle 3 near the vehicle 1 over the positional relationship with the obstacle 3 far away from the vehicle 1.

The invention claimed is:

1. A vehicle control apparatus for assisting with driving of a vehicle, wherein the vehicle control apparatus comprises:
   non-transitory computer-readable memory of an electronic control unit (ECU) of the vehicle control apparatus; and
   a processor of the electronic control unit of the vehicle control apparatus operatively coupled to the non-transitory computer-readable memory and a plurality of sensors of the vehicle to receive sensor information from the sensors, the processor being configured to repeatedly execute, in specified control cycles:
   processing to calculate a target travel route of the vehicle;
   processing to calculate a correction travel route based on the target travel route under a specified constraint condition using a vehicle model for estimation of behavior of the vehicle and to calculate a control target value of the vehicle so as to make the vehicle travel on the correction travel route; and generate and output request signals to driving control components of the vehicle based on the control target value of the vehicle to make the vehicle travel on the correction travel route, wherein when calculating the correction travel route, the vehicle control apparatus calculates the correction travel route using an evaluation function for evaluation of the correction travel route under the constraint condition to minimize a difference in the correction travel route from the target travel route, the correction travel route includes plural prediction points that the vehicle passes before lapse of a specified prediction period, and the evaluation function is a sum that is acquired by weighting an evaluation value at each of the prediction points by a weight coefficient that is set for each of the prediction points, and a time interval between each adjacent pair of the prediction points of the plural prediction points is set to be increased from a near side toward a far side from the vehicle, and the weight coefficient, which is set for each of the prediction points, is set such that weight at the prediction point on the far side from the vehicle is less than weight at the prediction point on the near side of the vehicle.

2. The vehicle control apparatus according to claim 1, wherein the weight at each of the prediction points is set to be inversely proportional to a square of a time that is required for the vehicle to arrive at each of the prediction points using the weight coefficient that is set for each of the prediction points.

3. The vehicle control apparatus according to claim 2, wherein at each of the prediction points, the evaluation function includes: an evaluation term to evaluate the correction travel route; and a constraint term that lowers the evaluation value when the correction travel route does not satisfy the constraint condition, at each of the prediction points, weight of the weight coefficient of the constraint term is set to be greater than weight of the weight coefficient of the evaluation term, and the weight coefficient of the constraint term is set such that the weight thereof at the prediction point on the far side from the vehicle is less than the weight thereof at the prediction point on the near side of the vehicle.

4. The vehicle control apparatus according to claim 3, wherein the vehicle control apparatus detects an obstacle on outside of the vehicle, and sets a speed distribution area, which defines distribution of an allowable upper limit value of a relative speed of the vehicle to the obstacle, between the obstacle and the vehicle, and the allowable upper limit value in the speed distribution area is set to be increased as a distance from the obstacle is increased, and the constraint condition includes that a relative speed of the vehicle to the obstacle does not exceed an allowable upper limit value in the speed distribution area.

5. The vehicle control apparatus according to claim 3, wherein the evaluation term has a plurality of evaluation factors, the evaluation factors are set so as to respectively correspond to a plurality of physical amounts each representing a behavior of the vehicle at a correction target position, and each of the physical amounts is one of a speed, acceleration, jerk, yaw rate, a lateral position with respect to a center of a lane, a vehicle angle, a steering angle, or a steering angular velocity of the vehicle.

6. The vehicle control apparatus according to claim 1, wherein the weight at each of the prediction points is set to be proportional to a common logarithm of a value that is inversely proportional to a square of a time required for the vehicle to arrive at each of the prediction points using the weight coefficient that is set for each of the prediction points.

7. The vehicle control apparatus according to claim 6, wherein at each of the prediction points, the evaluation function includes: an evaluation term to evaluate the correction travel route; and a constraint term that lowers the evaluation value when the correction travel route does not satisfy the constraint condition, at each of the prediction points, weight of the weight coefficient of the constraint term is set to be greater than weight of the weight coefficient of the evaluation term, and the weight coefficient of the constraint term is set such that the weight thereof at the prediction point on the far side from the vehicle is less than the weight thereof at the prediction point on the near side of the vehicle.

8. The vehicle control apparatus according to claim 7, wherein the vehicle control apparatus detects an obstacle on outside of the vehicle, and sets a speed distribution area, which defines distribution of an allowable upper limit value of a relative speed of the vehicle to the obstacle, between the obstacle and the vehicle, and the allowable upper limit value in the speed distribution area is set to be increased as a distance from the obstacle is increased, and the constraint condition includes that a relative speed of the vehicle to the obstacle does not exceed an allowable upper limit value in the speed distribution area.

9. The vehicle control apparatus according to claim 8, wherein the evaluation term has a plurality of evaluation factors, the evaluation factors are set so as to respectively correspond to a plurality of physical amounts each representing a behavior of the vehicle at a correction target position, and each of the physical amounts is one of a speed, acceleration, jerk, yaw rate, a lateral position with respect to a center of a lane, a vehicle angle, a steering angle, or a steering angular velocity of the vehicle.

10. The vehicle control apparatus according to claim 7, wherein the evaluation term has a plurality of evaluation factors, the evaluation factors are set so as to respectively correspond to a plurality of physical amounts each representing a behavior of the vehicle at a correction target position, and each of the physical amounts is one of a speed, acceleration, jerk, yaw rate, a lateral position with respect to a center of a lane, a vehicle angle, a steering angle, or a steering angular velocity of the vehicle.

11. The vehicle control apparatus according to claim 4, wherein the evaluation term has a plurality of evaluation factors, the evaluation factors are set so as to respectively correspond to a plurality of physical amounts each representing a behavior of the vehicle at a correction target position, and each of the physical amounts is one of a speed, acceleration, jerk, yaw rate, a lateral position with respect to a center of a lane, a vehicle angle, a steering angle, or a steering angular velocity of the vehicle.

12. The vehicle control apparatus according to claim 1, wherein
at each of the prediction points, the evaluation function includes: an evaluation term to evaluate the correction travel route; and a constraint term that lowers the evaluation value when the correction travel route does not satisfy the constraint condition,
at each of the prediction points, weight of the weight coefficient of the constraint term is set to be greater than weight of the weight coefficient of the evaluation term, and the weight coefficient of the constraint term is set such that the weight thereof at the prediction point on the far side from the vehicle is less than the weight thereof at the prediction point on the near side of the vehicle.

13. The vehicle control apparatus according to claim 12, wherein
the vehicle control apparatus detects an obstacle on outside of the vehicle, and sets a speed distribution area, which defines distribution of an allowable upper limit value of a relative speed of the vehicle to the obstacle, between the obstacle and the vehicle, and the allowable upper limit value in the speed distribution area is set to be increased as a distance from the obstacle is increased, and
the constraint condition includes that a relative speed of the vehicle to the obstacle does not exceed an allowable upper limit value in the speed distribution area.

14. The vehicle control apparatus according to claim 12, wherein
the evaluation term has a plurality of evaluation factors,
the evaluation factors are set so as to respectively correspond to a plurality of physical amounts each representing a behavior of the vehicle at a correction target position, and
each of the physical amounts is one of a speed, acceleration, jerk, yaw rate, a lateral position with respect to a center of a lane, a vehicle angle, a steering angle, or a steering angular velocity of the vehicle.

15. A vehicle control apparatus for assisting with driving of a vehicle, wherein the vehicle control apparatus is configured to repeatedly execute, in specified control cycles:
processing to calculate a target travel route of the vehicle; and
processing to calculate a correction travel route based on the target travel route under a specified constraint condition using a vehicle model for estimation of behavior of the vehicle and to calculate a control target value of the vehicle so as to make the vehicle travel on the correction travel route,
when calculating the correction travel route, the vehicle control apparatus calculates the correction travel route using an evaluation function for evaluation of the correction travel route under the constraint condition to minimize a difference in the correction travel route from the target travel route,
the correction travel route includes plural prediction points that the vehicle passes before lapse of a specified prediction period, and the evaluation function is a sum that is acquired by weighting an evaluation value at each of the prediction points by a weight coefficient that is set for each of the prediction points, and
a time interval between each adjacent pair of the prediction points of the plural prediction points is set to be increased from a near side toward a far side from the vehicle, and the weight coefficient, which is set for each of the prediction points, is set such that weight at the prediction point on the far side from the vehicle is less than weight at the prediction point on the near side of the vehicle,
the vehicle control apparatus detects an obstacle on outside of the vehicle, and sets a speed distribution area, which defines distribution of an allowable upper limit value of a relative speed of the vehicle to the obstacle, between the obstacle and the vehicle, and the allowable upper limit value in the speed distribution area is set to be increased as a distance from the obstacle is increased, and
the constraint condition includes that a relative speed of the vehicle to the obstacle does not exceed an allowable upper limit value in the speed distribution area.

16. The vehicle control apparatus according to claim 15, wherein the weight at each of the prediction points is set to be proportional to a common logarithm of a value that is inversely proportional to a square of a time required for the vehicle to arrive at each of the prediction points using the weight coefficient that is set for each of the prediction points.

17. The vehicle control apparatus according to claim 16, wherein
at each of the prediction points, the evaluation function includes: an evaluation term to evaluate the correction travel route; and a constraint term that lowers the evaluation value when the correction travel route does not satisfy the constraint condition,
at each of the prediction points, weight of the weight coefficient of the constraint term is set to be greater than weight of the weight coefficient of the evaluation term, and the weight coefficient of the constraint term is set such that the weight thereof at the prediction point on the far side from the vehicle is less than the weight thereof at the prediction point on the near side of the vehicle.

* * * * *